US012455353B2

(12) United States Patent
Baron et al.

(10) Patent No.: US 12,455,353 B2
(45) Date of Patent: Oct. 28, 2025

(54) SCANNING LASER DEVICES AND METHODS WITH NON-UNIFORM OPTICAL EXPANSION AND PULSE ENERGY VARIATION

(71) Applicant: Microvision, Inc., Redmond, WA (US)

(72) Inventors: Henry J. Baron, Kirkland, WA (US); Alga Lloyd Nothern, III, Seattle, WA (US); Christopher Brian Adkins, Woodinville, WA (US); Jonathan A. Morarity, Seattle, WA (US)

(73) Assignee: Microvision, Inc., Redmond, WA (US)

( * ) Notice: Subject to any disclaimer, the term of this patent is extended or adjusted under 35 U.S.C. 154(b) by 1183 days.

(21) Appl. No.: 17/303,606

(22) Filed: Jun. 3, 2021

(65) Prior Publication Data

US 2022/0390569 A1    Dec. 8, 2022

(51) Int. Cl.
  *G01S 7/481*   (2006.01)
  *G01S 7/484*   (2006.01)
  *G02B 26/10*   (2006.01)

(52) U.S. Cl.
  CPC .......... *G01S 7/4817* (2013.01); *G01S 7/484* (2013.01); *G02B 26/105* (2013.01)

(58) Field of Classification Search
  CPC ...... G01S 7/4814; G01S 7/497; G01S 7/4817; G01S 7/484; G01S 17/42; G01S 7/4868; G01S 17/14; G02B 26/105
  See application file for complete search history.

(56) References Cited

U.S. PATENT DOCUMENTS

| 10,474,248 | B2 | 11/2019 | Viswanathan |
| 10,671,219 | B2 | 6/2020 | Viswanathan |
| 2018/0088214 | A1 | 3/2018 | O'Keeffe |
| 2018/0113200 | A1* | 4/2018 | Steinberg ............ G01S 7/4812 |
| 2018/0231639 | A1 | 8/2018 | Ohtomo et al. |

(Continued)

FOREIGN PATENT DOCUMENTS

| DE | 102017200691 A1 * | 7/2018 | ............ G01S 17/10 |
| EP | 3187895 | 7/2017 | |

(Continued)

OTHER PUBLICATIONS

Microvision, , "International Search Report and Written Opinion".

*Primary Examiner* — Yuqing Xiao
*Assistant Examiner* — Andrea Maria Baca
(74) *Attorney, Agent, or Firm* — Kevin D. Wills

(57) ABSTRACT

The embodiments described herein provide systems and methods that can improve performance in scanning laser devices. Specifically, the systems and methods utilize a non-uniform variation in optical expansion coupled with variation in the energy level of laser light pulses to provide an improved effective range over a scanning area. In general, the improved effective range varies over the scan field, with relatively long effective range in some areas of the scan field and relatively short effective range in other areas of the scan field. This varying range over the scan field is facilitated by expansion optics that provide a non-uniform variation in optical expansion for laser light pulses relative to position along a first axis in the scan field and by a light source controller that varies the energy level of the laser light pulses according to position along the first axis of the scan field.

23 Claims, 28 Drawing Sheets

(56) References Cited

U.S. PATENT DOCUMENTS

| | | | |
|---|---|---|---|
| 2018/0284224 A1* | 10/2018 | Weed | G01S 17/42 |
| 2018/0284237 A1* | 10/2018 | Campbell | G01S 17/931 |
| 2019/0064694 A1* | 2/2019 | Nagai | G03G 15/04072 |
| 2019/0219676 A1 | 7/2019 | Frederiksen et al. | |
| 2021/0157009 A1 | 5/2021 | Bondy et al. | |

FOREIGN PATENT DOCUMENTS

| | | |
|---|---|---|
| JP | H08-261753 | 3/1995 |
| JP | 2013072991 | 4/2013 |
| JP | 2016057141 | 4/2016 |
| JP | 2017-161500 | 12/2016 |
| KR | 10-2019-0029901 | 3/2019 |
| KR | 10-2019-0114343 | 10/2019 |

\* cited by examiner

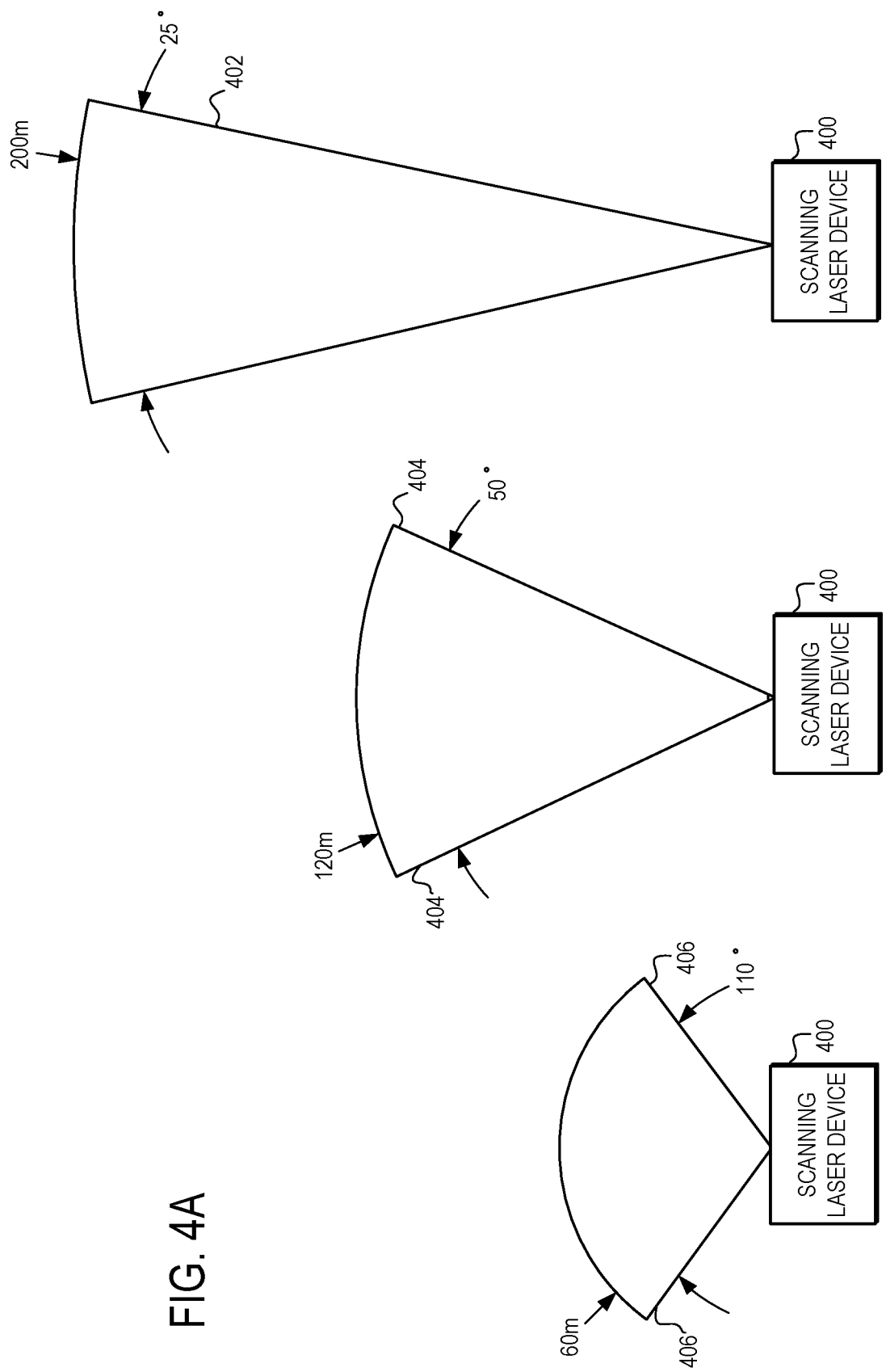

| PH5*PV3 | PH4*PV3 | PH3*PV3 | PH2*PV3 | PH1*PV3 | PH1*PV3 | PH2*PV3 | PH3*PV3 | PH4*PV3 | PH5*PV3 |
| PH5*PV2 | PH4*PV2 | PH3*PV2 | PH2*PV2 | PH1*PV2 | PH1*PV2 | PH2*PV2 | PH3*PV2 | PH4*PV2 | PH5*PV2 |
| PH5*PV1 | PH4*PV1 | PH3*PV1 | PH2*PV1 | PH1*PV1 | PH1*PV1 | PH2*PV1 | PH3*PV1 | PH4*PV1 | PH5*PV1 |
| PH5*PV1 | PH4*PV1 | PH3*PV1 | PH2*PV1 | PH1*PV1 | PH1*PV1 | PH2*PV1 | PH3*PV1 | PH4*PV1 | PH5*PV1 |
| PH5*PV2 | PH4*PV2 | PH3*PV2 | PH2*PV2 | PH1*PV2 | PH1*PV2 | PH2*PV2 | PH3*PV2 | PH4*PV2 | PH5*PV2 |
| PH5*PV3 | PH4*PV3 | PH3*PV3 | PH2*PV3 | PH1*PV3 | PH1*PV3 | PH2*PV3 | PH3*PV3 | PH4*PV3 | PH5*PV3 |

HORI°

VERT°

SCANNING LASER DEVICES AND METHODS WITH NON-UNIFORM OPTICAL EXPANSION AND PULSE ENERGY VARIATION

FIELD

The present disclosure generally relates to scanning laser devices and methods, and more particularly relates to light detection and ranging (LiDAR) systems and methods.

BACKGROUND

Scanning laser devices have been developed and implemented for a wide variety of applications, including object detection. For example, light detection and ranging (LiDAR) systems have been developed to generate 3D maps of surfaces, where the 3D maps describe the variations in depth over the surface. Such object detection and depth mapping have been used in a variety of applications, including object and motion sensing, navigation and control. For example, such LiDAR devices are being used in the navigation and control of autonomous vehicles, including autonomous devices used for transportation and manufacturing.

One issue in some LiDAR systems is the need to balance effective range with power consumption. For example, some LiDAR systems need a relatively long effective range but also have the need to reduce overall power consumption. Furthermore, in some LiDAR systems there is a need for different effective ranges over different areas, again while reducing overall power consumption. As such, there remains a need for improved systems and methods for detection in LiDAR systems and other scanning laser devices.

BRIEF DESCRIPTION OF THE DRAWINGS

FIGS. 4A-4H show schematic views of a LiDAR system and laser light pulse energy level adjustment in accordance with various embodiments of the present invention;

FIGS. 5C and 5D show tables of energy level adjustment factors in accordance with various embodiments of the present invention;

DESCRIPTION OF EMBODIMENTS

The embodiments described herein provide systems and methods that can facilitate an improved effective range with reduced power consumption in scanning laser devices. Specifically, the systems and methods utilize a non-uniform variation in optical expansion coupled with variation in the energy level of laser light pulses to provide an improved effective range over a scanning area while reducing overall power consumption.

In general, the improved effective range varies over the scan field, with relatively long effective range in some areas of the scan field and relatively short effective range in other areas of the scan field. This varying range over the scan field is facilitated by expansion optics that provide a non-uniform variation in optical expansion for laser light pulses relative to position along a first axis in the scan field and by a light source controller that varies the energy level of the laser light pulses according to position along the first axis of the scan field. Together, the expansion optics and light source controller provide this improved effective range while reducing overall power consumption. In one specific embodiment this improved effective range comprises a range that varies over the scan field, with a longer effective range in center areas of the scan field and a shorter effective range in one or more side areas of the scan field. As will be described in greater detail below this variable range can provide improved functionality in some scanning laser device applications.

Figure 1:
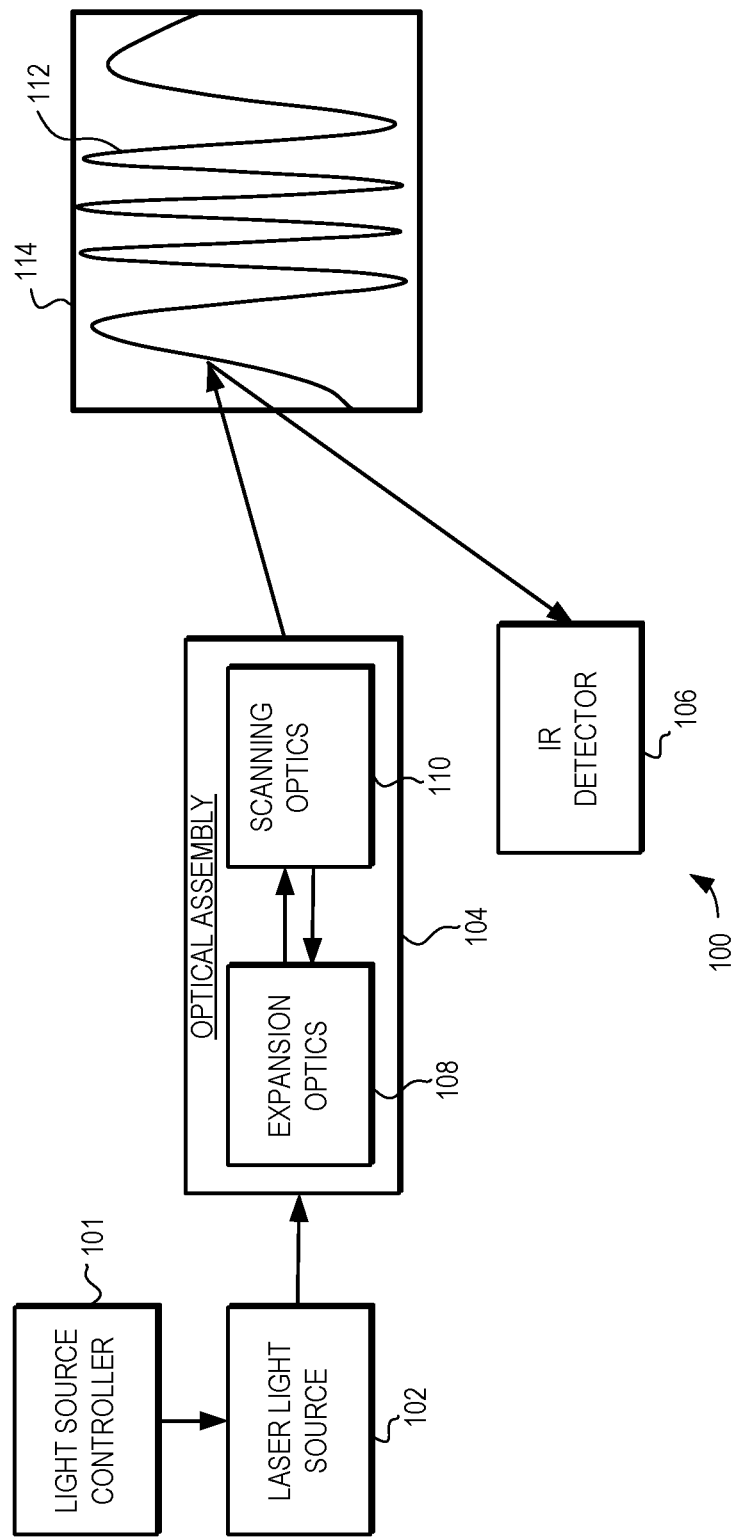
FIG. 1 shows a schematic diagram of a scanning laser device in accordance with various embodiments of the present invention.

Turning now to FIG. 1, a schematic diagram of a scanning laser device 100 is illustrated. In one embodiment, the scanning laser device 100 is a light detection and ranging (LiDAR) system used for object detection and/or 3D map generation. The scanning laser device 100 includes a light source controller 101, a laser light source 102, an optical assembly 104, and a detector 106. The optical assembly 104 includes a variety of optical elements for laser scanning, including expansion optics 108 and scanning optics 110. During operation, the laser light source 102 generates pulses of laser light that are scanned by the optical assembly 104 in a pattern 112 of scan lines inside a scan field 114.

The detector 106 is configured to receive reflections of the laser light pulses from objects within the scan field 114. The received reflections of the laser light pulses can then be used to detect those objects within the scan field 114. For example, time-of-flight (TOF) measurements of the received reflections can be used to generate 3-dimensional point clouds that describe the depth of a surface at each point, and thus can be used to generate a depth map of the object surface.

In the example of FIG. 1, the pattern 112 of scan lines in the scan field 114 comprises a raster pattern. However, this is just one example, and in other embodiments other patterns of scan lines can be generated as used. To facilitate the generation of the pattern 112, a drive circuit can be implemented to controls the movement of scanning optics 110. Examples of this will be described in greater detail below.

In accordance with the embodiments described herein the expansion optics 108 are configured to provide a non-uniform variation in optical expansion for laser light pulses relative to position along a first axis in the scan field 114. The light source controller 101 is configured to vary the energy level of the laser light pulses according to position along the first axis of the scan field 114.

In general, the non-uniform variation in optical expansion provided by the expansion optics 108 coupled with variation in the energy level of laser light pulses provided by the light source controller 101 provide an improved effective range over a scanning area while reducing overall power consumption. Specifically, in one embodiment the expansion optics 108 and light source controller 101 provide an improved effective range that that varies over the scan field 114, with a longer effective range in center areas of the scan field 114 and a shorter effective range in edge areas of the scan field 114.

As will be described in greater detail below, the expansion optics 108 implement the non-uniform optical expansion. In general, this non-uniform optical expansion includes a non-uniform change in the exit pointing angle from the expansion optics 108. Additionally, this non-uniform optical expansion can also include a non-uniform change in the beam width and beam divergence of the laser light pulses exiting the expansion optics 108. Detailed examples of such optical expansions and the expansion optics used to implement them will be described in greater detail below.

One issue with non-uniform optical expansion is the effect of the optical expansion on the range of the scanning laser device 100. For example, an increase in optical expansion will typically increase the change in exit pointing angle, decrease beam width and increase beam divergence. Thus, a non-uniform optical expansion will result in a non-uniform decrease in beam width and a non-uniform increase in beam divergence. This decrease in beam width can reduce the effective range of the scanning laser device 100 by decreasing the effective size of the receive aperture of the detector 106. Similarly, the increase in beam divergence can reduce the effective range of the scanning laser device by increasing the relative amount of noise received at the detector 106. Thus, in each case the in non-uniform variation of optical expansion can create non-uniform changes in the effective range of the scanning laser device 100.

As described above, the light source controller 101 is configured to vary the energy level of the laser light pulses according to position along the first axis of the scan field 114. The variation of the energy level of the laser light pulses is performed provide the desired effective range of the sensor while at least partially compensating for the effects of the non-uniform optical expansion provided by the expansion optics. For example, in one embodiment the light source controller 101 is configured to vary the energy in a manner proportional to the non-uniform variation in optical expansion. Thus, laser light pulses that are subjected to greater optical expansion are generated with greater energy levels. As will be described in greater detail below, this increase in energy level compensates for the reduction in effective range that would otherwise occur due to the increasing amounts of optical expansion. Furthermore, by varying the energy level of the laser light pulses in this manner the overall power consumption of the scanning laser device 100 can be reduced while providing the desired effective range.

In general, the non-uniform variation in optical expansion provided by the expansion optics 108 coupled with variation in the energy level of laser light pulses provided by the light source controller 101 provide an improved effective range over a scanning area while reducing overall power consumption. Additionally, in some embodiments the scanning laser device 100 is implemented to provide an improved effective range that varies over the scan field 114. Thus, the scanning laser device 100 can be implemented to have different effective ranges in different areas of the scan field 114. These different effective ranges are facilitated by varying the energy level of the laser light pulses in a manner that both adjusts the energy level for desired effective range and the amount of optical expansion in that area of the scan field 114.

As one specific example, the expansion optics 108 and light source controller 101 are implemented to facilitate longer effective ranges in center areas of the scan field 114 and a shorter effective range in edge areas of the scan field 114. Again, in implementing such different effective ranges the laser light source controller 101 would be vary the energy levels of the laser light pulses to provide these different ranges while compensating for the reduction in effective range that would otherwise occur due to the varying amounts of optical expansion. Detailed examples of such embodiments will be described in greater detail below.

The laser light source controller 101 can use a variety of techniques and devices to vary the energy level of the laser light pulses. For example, the laser light controller 101 can be implemented to dynamically change the pulse duration of the laser light pulses. As another example, the laser light controller 101 can be implemented to dynamically change the pulse amplitude of the laser light pulses. As another example, the laser light controller 101 can be implemented to dynamically change the current used to drive the lasers. As another example, the laser light controller 101 can be implemented to dynamically change the number of lasers used to generate a pulse. As another example, the laser light controller 101 can be implemented to dynamically change the number of pulses at each scan point. And various combinations of these techniques can be employed.

In some embodiments the laser light source controller 101 can be implemented as part of a pulse generation circuit. Detailed examples of such pulse generation circuits will be described in greater detail below.

In one embodiment, the non-uniform variation in optical expansion provided by the expansion optics 108 comprises a non-linear rate of optical expansion relative to position along a first axis in the scan field. For example, in one more specific embodiment the non-uniform variation in optical expansion comprises a greater optical expansion relative to the position of the laser light pulses in a first side region along the first axis compared to lesser optical expansion relative to the position of the laser light pulses in a center region along the first axis between the first side region and a second side region. Detailed examples of non-uniform and non-linear rates of optical expansion will be discussed in greater detail below.

As described above, the expansion optics 108 can be configured to provide a non-uniform variation in optical expansion for laser light pulses relative to position along a first axis in the scan field 114, while the light source controller 101 is correspondingly configured to vary the energy level of the laser light pulses according to position along the first axis of the scan field 114. In some embodiments the scan field 114 includes a second axis perpendicular to the first axis, and the light source controller 101 is further configured to vary the energy level of the laser light pulses along the second axis in the scan field 114. In other embodiments the light source controller 101 is further configured to further vary the energy level of the laser light pulses relative to the position along the first axis and the second axis responsive to road parameters. In other embodiments the light source controller 101 is configured to vary the energy level of the laser light pulses relative to the position along the second axis to limit the height of the scan field 114. Detailed examples of these embodiments will be discussed in greater detail below.

In addition to the detector 106 in some embodiments the scanning laser device 100 is implemented to include one or more additional detectors. For example, a second detector can be implemented to receive reflections of the IR laser light pulses of the laser light pulses from within the scan field through the optical assembly 104.

The scanning laser device 100 can also include other elements. For example, the scanning laser device 100 can also include time-of-flight (TOF) circuitry responsive to the detector 106 to measure distances to objects at the depth measurement points in the scan field.

And in other embodiments the scanning laser device 100 can also include a virtual protective housing circuit that, for a plurality of depth measurement points, causes the laser light source to emit a first IR laser light pulse at a first pulse energy to detect an object within a short range, and responsive to determining that there is no object within the short range causes the laser light source to emit at least one second IR laser light pulse having a total second energy level to detect an object within a long range, wherein the first energy level is lower than the total second energy level. A detailed example of such a virtual protective housing circuit will be described below.

Figure 2:
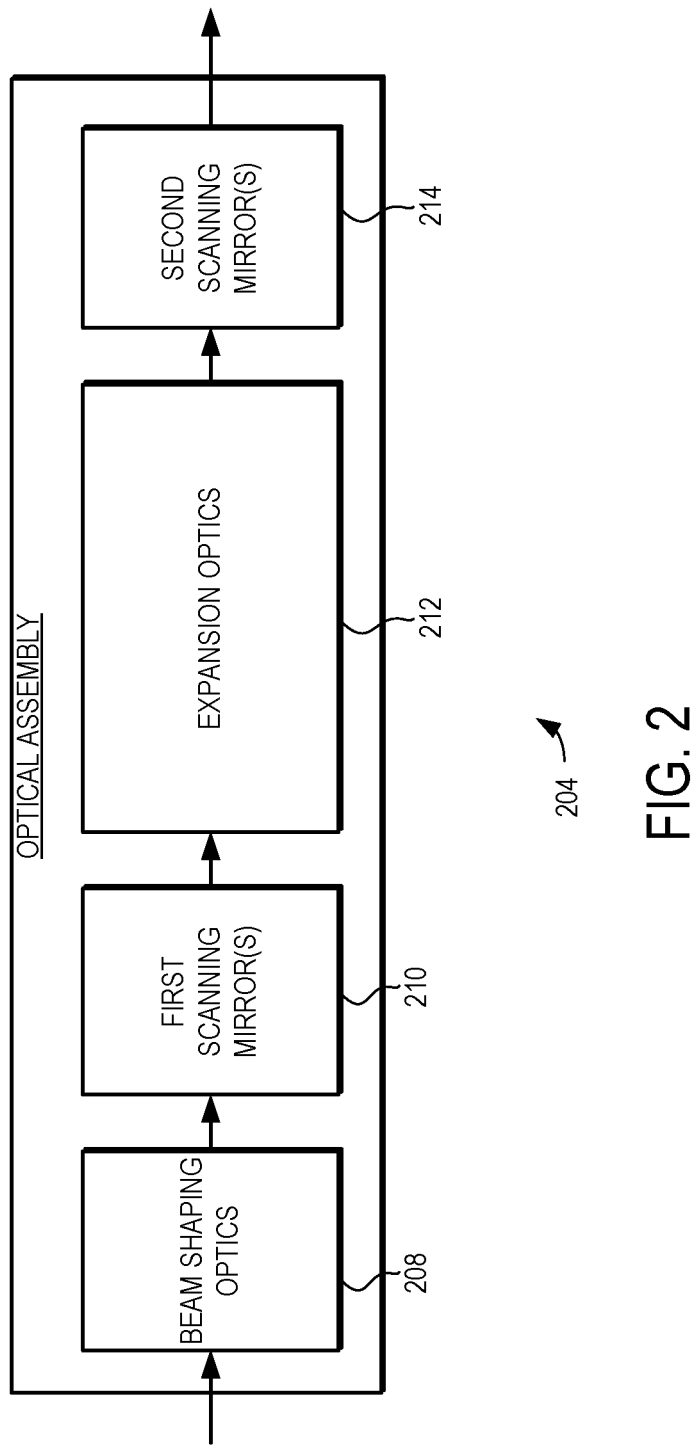
FIG. 2. shows a schematic view of an optical assembly in accordance with various embodiments of the present invention.

Turning now to FIG. 2, a more detailed embodiment of an optical assembly 204 is illustrated. The optical assembly 204 includes optical elements used for scanning laser beam pulses over a scan field. The optical assembly 204 is an example of the type of optical assembly that can be used in a LiDAR or other scanning laser device (e.g., scanning laser device 100) in accordance with the embodiments described herein. The optical elements illustrated in FIG. 2 includes beam shaping optics 208, first scanning mirror(s) 210, expansion optics 212, and second scanning mirror(s) 214, although this is just one non-limiting example. Again, during operation of a scanning laser device a laser light source generates laser light pulses that are scanned by the optical assembly 204 into scan trajectory (e.g., pattern 112) over a scan field (e.g., scan field 114).

For example, the laser light source can comprise one or more infrared (IR) lasers implemented to generate IR laser light pulses. In one specific example, the pulses from multiple IR laser light sources are combined and shaped by beam shaping optics 208. The beam shaping optics 208 can include any optics for changing the beam shape of the laser light pulses. For example, the beam shaping optics 208 can include optical elements for changing the beam shape, changing the beam collimation, combining multiple beams, and aperturing the beam(s).

The output of the beam shaping optics 208 is passed to the first scanning mirror 210. In general, the first scanning mirror 210 provides for one axis of motion (e.g., horizontal), while the second scanning mirror 214 provides for another, typically orthogonal, axis of motion (e.g., vertical). Thus, the first scanning mirror 210 scans the laser beam pulses across one direction (e.g. horizontal), while the second scanning mirror 214 scans across the other direction (e.g., vertical). Furthermore, in a typical implementation of such an embodiment, the first scanning mirror 210 is operated to provide the scanning motion at one rate (e.g., a relatively slow scan rate), while the second scanning mirror 214 is operated to provide motion at a different rate (e.g., a relatively fast scan rate). Together, this results in the laser light pulses being scanned into scan trajectory pattern (e.g., pattern 112). It further be noted labels "vertical" and "horizontal" used herein are somewhat arbitrary, since a 90 degree rotation of the scanning laser device will effectively switch the horizontal and vertical axes.

The output of the first scanning mirror 210 is passed to the expansion optics 212. In general, the expansion optics 212 are implemented to provide an expansion of the scan field in one or more directions. For example, the expansion optics 212 can be implemented to provide an angular expansion along the axis of motion of the first scanning mirror 210. Thus, in one example where the first scanning mirror 210 provides relatively slow speed scanning along the horizontal axis, the expansion optics 212 can be implemented to increase the scanning angle along in the horizontal direction. As one specific example, the first scanning mirror 210 can be implemented to provide a scanning angle in the horizontal direction of 40 degrees, and the expansion optics 212 can be implemented to expand the scanning angle to 110 degrees, thus expanding the size of the resulting scan trajectory and scan field.

To provide this expansion the expansion optics 212 can be implemented with one or more lenses, with the one or more lenses configured to together provide the desired angular expansion. In one specific example, the expansion optics 212 is implemented with three separate lenses. A description of such an embodiment will be described in greater detail below.

The output of the expansion optics 212 is passed to the second scanning mirror 214. Again, the first scanning mirror 210 provides for one axis of motion (e.g., horizontal), while the second scanning mirror 214 provides for another, typically orthogonal, axis of motion (e.g., vertical). Furthermore, the first scanning mirror 210 and second scanning mirror 214 operate at different scan rates. In one specific embodiment the second scanning mirror 214 provides vertical high rate scanning, while the first scanning mirror 210 provides horizontal low rate scanning.

During operation, optical assembly 204 thus operates to receive laser light pulses and scan those laser light pulses into a scan trajectory pattern inside a scan field.

Figure 3A:
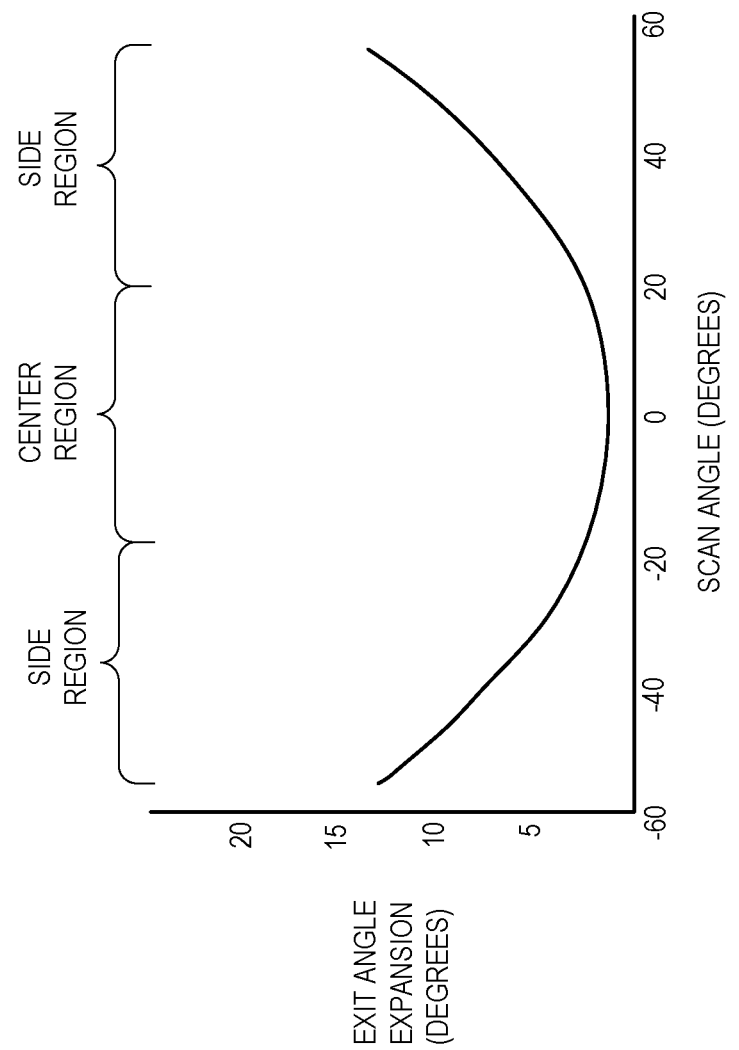
FIGS. 3A, 3B and 3C show graphs of optical expansion, scan trajectory, and laser light pulse energy level adjustment in accordance with various embodiments of the present invention.

Turning now to FIG. 3A, a representation of optical expansion in a scan field is illustrated in graph 300. Specifically, graph 300 shows the exit pointing angle expansion as a function of the scan angle along a first axis, where the first axis also corresponds to a first axis in the resulting scan field. This exit angle expansion is an example of the type of optical expansion that can be provided by the expansion optics of a scanning laser device (e.g., expansion optics 108 of FIG. 1, expansion optics 212 of FIG. 2). The optical expansion illustrated in graph 300 is non-uniform relative to a first axis, and more specifically results in a non-linear optical expansion relative to an axis in the scan field. This non-uniform and non-linear optical expansion results in a higher rate of optical expansion variation in the side regions of the scan field along the first axis compared to the lower rate of optical expansion variation in the center region.

Stated another way, the graph 300 shows an optical expansion where there is a greater change in optical expansion relative to the position of the laser light pulses along the first axis in a first side region and a second side region compared to a lesser change in optical expansion in the center region between the side regions. This is shown by the increasingly steep slopes of the function curve as distance from the center increases.

In a typical embodiment the non-linear optical expansion illustrated in graph 300 can be represented by a higher-order mathematical function (e.g., quadratic and higher-order polynomial functions, etc.). Such a function can be implemented into the scanning laser device and used to determine the energy level for laser light pulses as a function of their scan angle in the first axis. It should be noted that the function curve representing the optical expansion in FIG. 3A is just one example implementation, and that expansion optics can be implemented with other types of non-linear and non-uniform expansion.

Figure 3B:
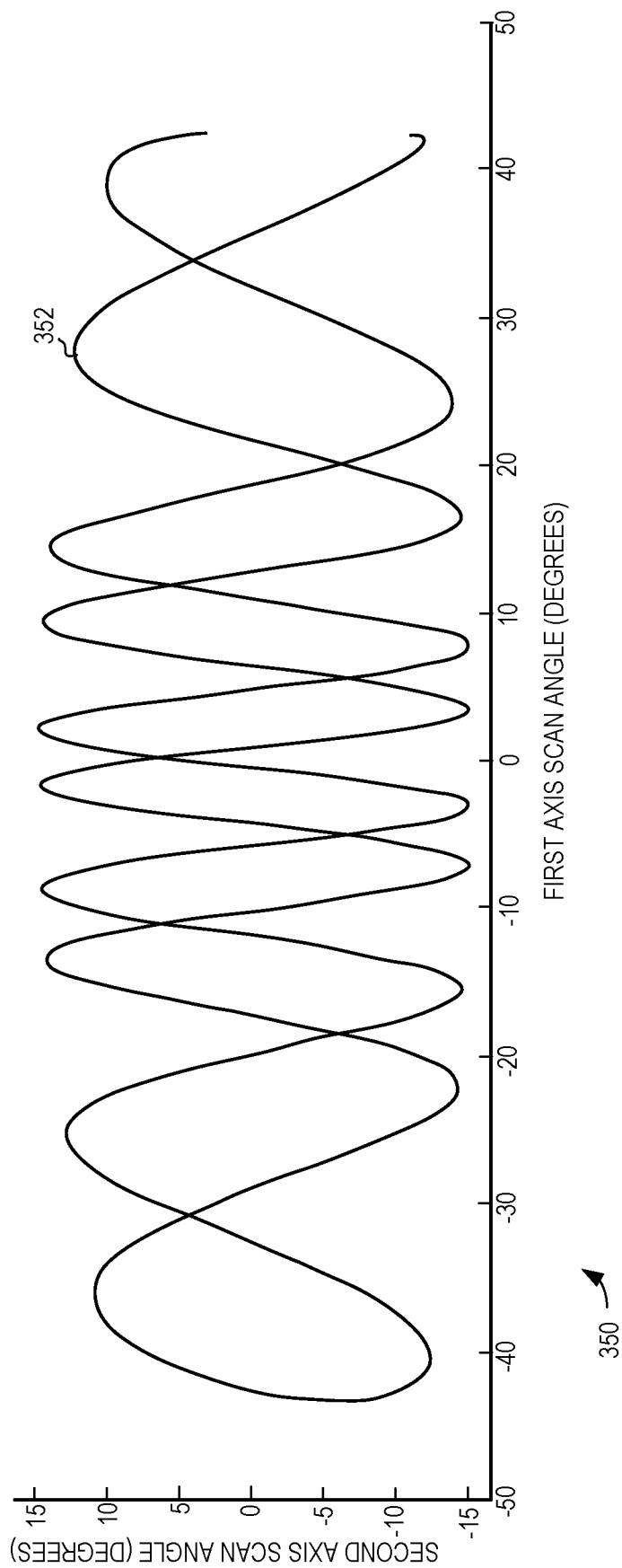

Turning now to FIG. 3B, a graph 350 illustrates an exemplary scan trajectory 352. The scan trajectory 352 is an example of the type of scan trajectory that can be generated with a scanning laser device that includes expansion optics that provide a non-uniform optical expansion with respect to a first axis (e.g., expansion optics 108 of FIG. 1, expansion optics 212 of FIG. 2). More specifically, the scan trajectory 352 is an example of the type of trajectory that can be generated with an optical expansion such as that illustrated in graph 300 of FIG. 3A. Thus, this scan trajectory 352 shows the result of a non-uniform and non-linear optical expansion where a higher rate of exit angle expansion variation is created in the side regions of the scan field along the first axis compared to the lower rate of exit angle expansion variation created in the center region.

The scan trajectory 352 is generated by the motion of one or more scanning mirror(s), with the mirror(s) providing deflection of the laser light pulses along a first axis and a second axis, with the non-uniform expansion provided by one or more expansion optics. In this illustrated example, the scanning motion in the first axis is relatively slow motion, while the scanning motion in the second axis is relatively fast motion. Also, in this example the motion in the first axis is horizontal, while the motion in the second axis is vertical (although it should be noted that the labels "vertical" and "horizontal" are somewhat arbitrary, since a 90 degree rotation of the scanning laser device will switch the horizontal and vertical axes).

Finally, it should be noted that the scan trajectory 352 is just one example trajectory that can result from non-uniform variations in optical expansion, and that many other implementations are possible.

As described above, a variation in the optical expansion such as that illustrated in FIGS. 3A and 3B can result in a variation in the effective range of the scanning laser detector. Specifically, a variation in optical expansion will result in a variation in beam width and beam divergence, which in turn can result in a variation in the effective range of the scanning laser device. Thus, in accordance with the embodiments described herein the light source controller (e.g., light source controller 101) is configured to vary the energy level of the laser light pulses to provide the desired effective range of the sensor by at least partially compensating for the effects of the non-uniform optical expansion provided by the expansion optics.

Figure 3C:
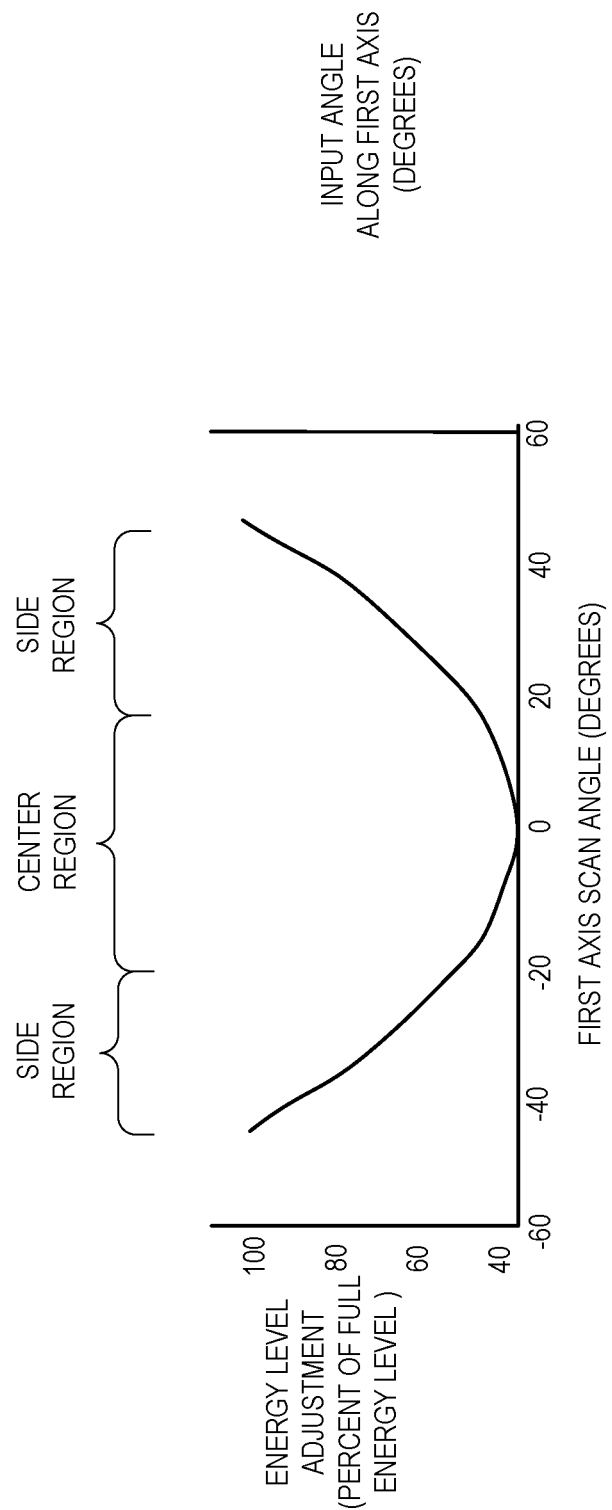

Turning now to FIG. 3C, a representation of laser light pulse energy level adjustment is illustrated in graph 370. Specifically, graph 370 shows the energy level adjustment as a function of the scan angle along a first axis, where the first axis also corresponds to a first axis in the resulting scan field. Notably, this illustrated energy level adjustment can be considered to be an increased percentage in energy level from a low power state or as a decreased percentage in energy level from a high power state.

Again, in one embodiment the light source controller (e.g., light source controller 101) is configured to vary the energy in a manner proportional to the non-uniform variation in optical expansion. Thus, laser light pulses that are subjected to greater optical expansion are generated with greater energy levels and vice versa. This increase in energy level compensates for the reduction in effective range that would otherwise occur due to the increasing amounts of optical expansion. Notably, the energy level adjustment illustrated in graph 370 is non-uniform relative to a first axis. Specifically, the graph 370 shows an embodiment where there is a greater change in energy level relative to the position of the laser light pulses along the first axis in a first side region and a second side region compared to a lesser change in energy level in the center region between the side regions. Again, such a variation in laser light pulse energy level can compensate for the effects of the optical expansion illustrated in FIGS. 3A and 3B to provide a desired effective range of the detector and the scanning laser device.

As described above, in some embodiments the scanning laser device (e.g., scanning laser device 100) is implemented to provide an improved effective range that varies over the scan field, with different effective ranges in different areas of the scan field. In these embodiments these different effective ranges are facilitated by varying the energy level of the laser light pulses in a manner that both adjusts the energy level for desired effective range in an area of the scan field and the amount of optical expansion in that area of the scan field.

Turning now to FIG. 4A, a schematic view of a scanning laser device 400 is illustrated. Specifically, FIG. 4A shows the scanning laser device 400 that is implemented with three different exemplary scan fields 402, 404 and 406, where the three different scan fields 402, 404 and 406 each have different effective ranges and different angular fields of view. As one example, these different effective ranges can be provided by implementing the scanning laser device 400 to operate in different modes at different times during operation, where each of the different modes has a different range and/or different angular field of view. For example, the scanning laser device 400 can be implemented to alternate or otherwise switch between different range modes in response to a variety of factors. In other embodiments that will be discussed in greater detail below, the scanning laser device 400 can be implemented provide these different ranges during different portions of the same scan trajectory.

In the example of FIG. 4A there are three range modes, a short range mode, an intermediate range mode, and a long range mode. The short range mode provides a scan field 406 with an effective range of 60 meters and an angular scan field of 110 degrees. The intermediate range mode provides a scan field 404 with an effective range of 120 meters and an angular scan field of 50 degrees. Finally, the long range mode provides a scan field 402 with an effective range of 200 meters and an angular scan field of view of 25 degrees. Of course, these are just examples, and other implementations are possible.

To implement these different range modes in the scanning laser device 400, a light source controller (e.g., laser light controller 101) would vary the energy levels of the laser light pulses to achieve the desired range while compensating for the optical expansion of the expansion optics (e.g., expansion optics 108). The three different angular extents of the scan fields 402, 404 and 406 can be achieved for these three modes by dynamically changing the angular range of mirror deflection. In other embodiments the angular range of mirror deflection can remain constant and the angular extents of the scan fields 402, 404 and 406 changed by selectively not transmitting laser light pulses when the mirror is outside the desired angular extent for the desired angular scan field. In either case the scanning laser device 400 can provide the desired effective range and desired angular extents of the scan field for each different operating mode.

Figure 4B:
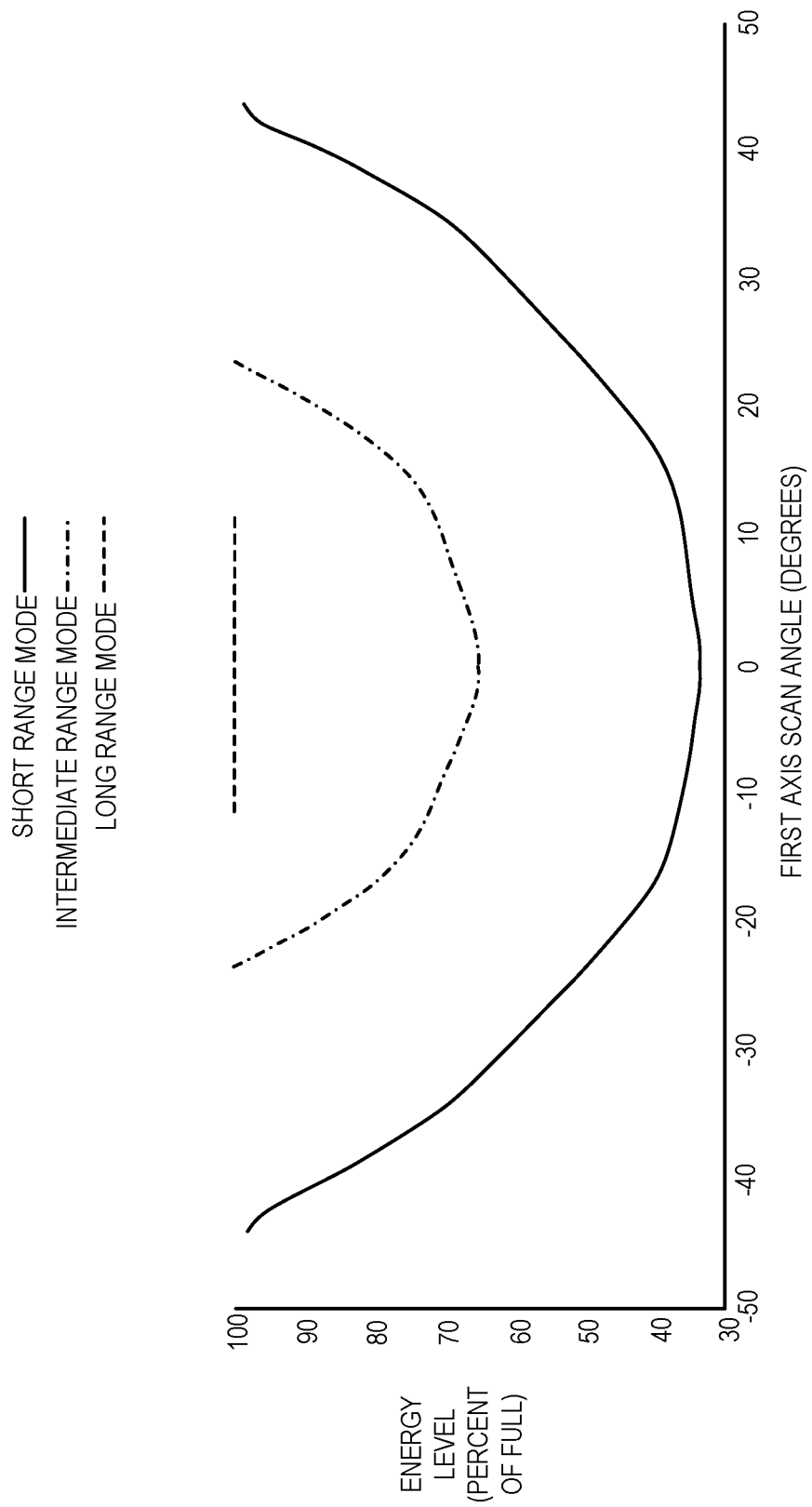

Turning now to FIG. 4B, a representation of laser light pulse energy levels is illustrated in graph 408. The graph 408 shows laser light pulse energy levels for three range modes, i.e., a long range mode, intermediate range mode, and a short range mode. These modes correspond to the exemplary scan fields 402, 404 and 406 illustrated in FIG. 4A. Thus, in long range mode the scanning laser device 400 is operated to have a range of 200 meters with a relatively narrow 25 degree field of view. In intermediate range mode the scanning laser device 400 is operated to have a range of 120 meters and a 50 degree field of view. In short range mode the scanning laser device 400 is operated to have a range of 60 meters and a relatively wide 110 degree field of view. Accordingly, the energy level of the laser light pulses is adjusted to provide these desired ranges, while also accounting for the non-uniform optical expansion provided by the expansion optics.

The graph 408 shows the energy level adjustment for three different modes as a function of the scan angle along a first axis, where the first axis also corresponds to a first axis in the resulting scan field. In this case the light source controller (e.g., light source controller 101) is configured to provide a relatively constant high energy level for the long range mode as the relatively narrow field of view limits the optical expansion of these pulses. In this example the energy level for the laser light pulses is at or near 100% of full pulse energy.

However, for the intermediate range and short range modes the light source controller is configured to vary the energy in a manner proportional to the non-uniform variation in optical expansion over the angular range covered by that mode. This allows the desired range to be achieved for both modes while compensating for the effects of the non-uniform optical expansion.

In both cases the energy level for the laser light pulses is at or near 100% of full pulse energy at the outer edges of the scan field for that mode, but the energy level rapidly decreases towards the center of the scan field. Specifically, in this example the intermediate range mode the energy level drops to approximately 65% of full pulse energy at the center of the scan field, and in the short range mode the energy level drops to approximately 33% of full pulse energy. Notably, the energy level adjustment is again proportional to the optical expansion within the angular range covered by the mode. Thus, in both the short and intermediate modes the energy level has a higher rate of change in the side regions where optical expansion also has a higher rate of change compared to the center region.

The examples of FIGS. 4A and 4B show a scanning laser device 400 implementations where there are separate modes with different effective ranges and different angular scan fields 402, 404 and 406. Again, in such an implementation the scanning laser device 400 could be implemented to switch between modes in a variety of patterns and/or based on a variety of factors. In those examples each mode had a relatively constant range across its respective scan field. However, in other embodiments, the scanning laser device 400 can instead be implemented provide these different ranges during different portions of the same scan frame, effectively providing dynamic range shaping over the scan field. To facilitate this scanning laser device 400 can be implemented to change the effective range at various points within each scan trajectory or scan frame. Thus, at these points within the scan trajectory the effective range can be increased or decreased to dynamically achieve the desired ranges over the scan field.

Figure 4C:
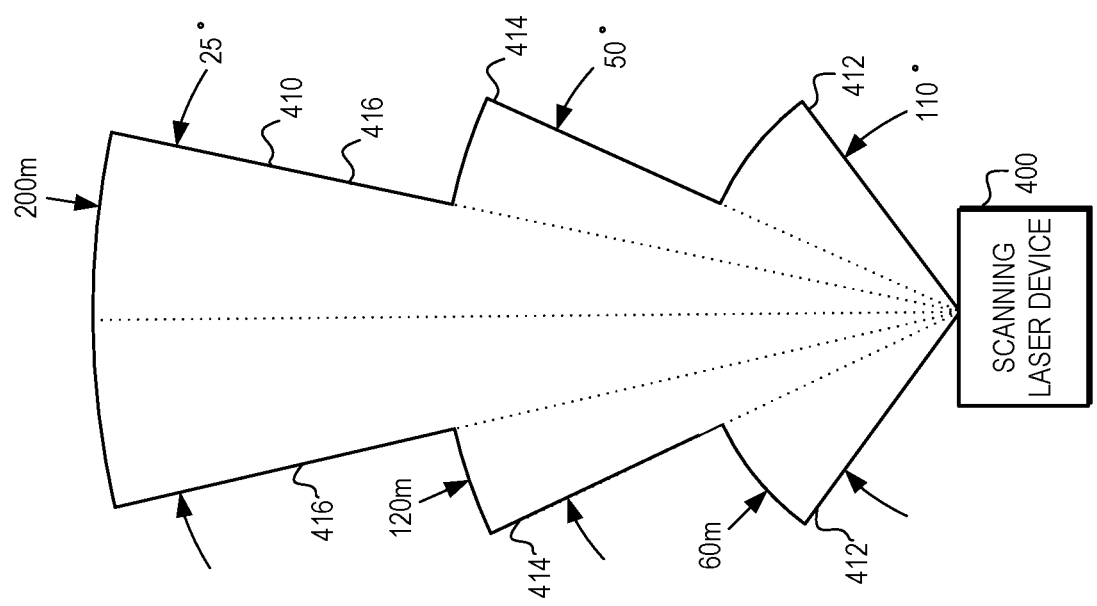

Turning now to FIG. 4C, a schematic view of a scanning laser device 400 with dynamic range shaping is illustrated. Specifically, FIG. 4C shows the scanning laser device 400 that is implemented to provide a scan field 410 that has three different effective ranges different ranges over different angular regions of the scan field 410. Again, such dynamic range shaping can be accomplished by implementing the scanning laser device 400 to adjust the pulse energy at different points within the scan trajectory.

Specifically, in the example of FIG. 4C the scan field 410 has short range regions 412 that have a range of 60 meters and correspond to expansion output angles between 25 and 55 and −25 and −55 degrees. The scan field 410 likewise has intermediate range regions 414 that have a range of 120 meters and correspond to expansion output angles between 12.5 and 25 degrees and −12.5 and −25 degrees. Finally, the scan field 410 has long range regions 416 that have a range of 200 meters and correspond to expansion angles between 0 and 12.5 degrees and 0 and −12.5 degrees. Thus, the scanning laser device 400 provides three different ranges over each scan trajectory or scan frame.

It should be noted that the example of FIG. 4C can be considered a superposition of the three range modes illustrated in FIG. 4A. Specifically, this example also provides a "long range area" (e.g., a center region with a range of 200 meters), an "intermediate range area" (e.g., intermediate regions with a range of 120 meters), and a "short range area" (e.g., outer regions with a range of 60 meters) over each scan trajectory.

The scanning laser device 400 can accomplishes this dynamic range shaping by varying the pulse energy to change effective ranges at 25, 12.5-12.5 and −25 degrees while also varying the pulse energy to compensate for the effects of the non-uniform optical expansion provided by the expansion optic. Thus, to implement the scanning laser device 400 to have these different ranges a light source controller (e.g., laser light controller 101) would vary the energy levels of the laser light pulses to compensate for the optical expansion of the expansion optics (e.g., expansion optics 108) and the different desired ranges at the various points in the scan trajectory. This achieves the desired ranges in the various regions while significantly reducing the amount of power used compared to a scanning laser device that only uses full power pulses.

Figure 4D:
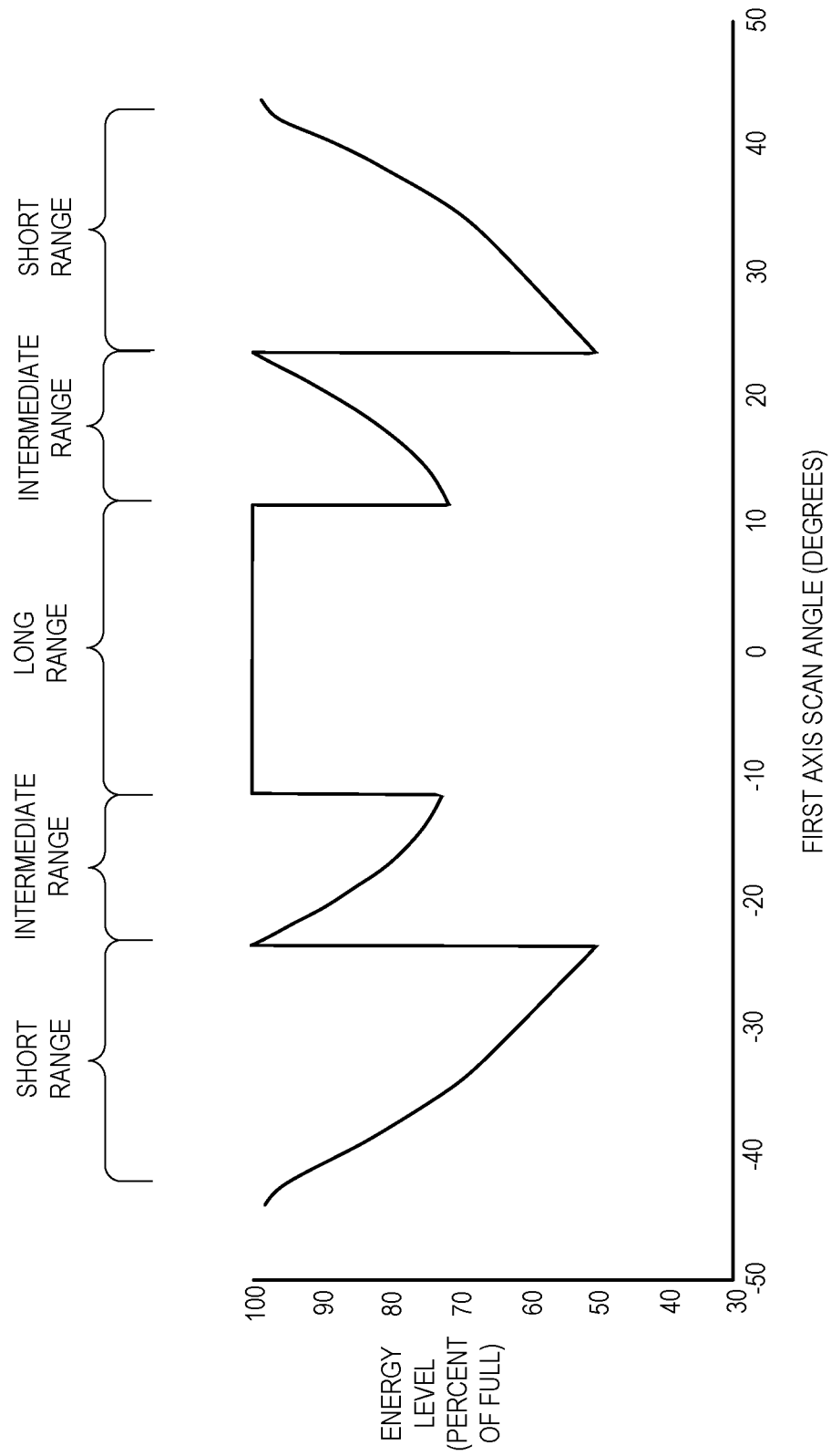

Turning now to FIG. 4D, a representation of laser light pulse energy levels is illustrated in graph 418. The graph 418 shows laser light pulse energy levels as a function of first axis scan angle needed to achieve the three different ranges of scan field 410 illustrated in FIG. 4C, where the first axis also corresponds to a first axis in the resulting scan field. Again, in this example the scan field 410 includes regions with three different ranges, i.e., long range regions, intermediate range regions, and short range regions. Thus, over each scan trajectory the laser light energy is varied to provide a range of 200 meters over the long range regions, a range of 120 meters over the intermediate range regions, and a range of 60 meters over the short range regions. Additionally, the energy level of the laser light pulses is adjusted over the scan field to compensate for the non-uniform optical expansion provided by the expansion optics in the scanning laser device. Thus, in areas of greater optical expansion more energy is provided to compensate for the effects of that expansion on effective range.

In this case the light source controller (e.g., light source controller 101) is configured to provide a relatively constant high energy level for the long range regions as the relatively narrow field of view limits the optical expansion of these pulses. Thus, laser light pulse energy level is at or near 100% of full pulse energy over the entire long range region.

However, for the intermediate range regions and short range regions the light source controller is configured to vary the energy in a manner proportional to the non-uniform variation in the optical expansion over those regions. This allows the desired range to be achieved for both the intermediate and short range regions while compensating for the non-uniform optical expansion caused by expansion optic for those scan angles.

Notably, the energy level for the laser light pulses is at or near 100% of full pulse energy at the outer edges of the regions for both the intermediate range and short range regions, but the energy level rapidly decreases towards the center scan angle. Thus, the energy level adjustment is again proportional to the optical expansion within those intermediate range and short range regions. Stated another way, in both the short and intermediate range regions the energy level has a higher rate of change in the outer angles where optical expansion also has a higher rate of change compared to the center scan angles.

It should be noted that while the graph 418 shows energy level adjustments that provide the desired ranges for long, intermediate, and short range regions while compensating for the effects of a non-uniform optical expansion, that this approach also reduces the overall power consumed compared to a system that simply uses full energy level pulses over entire the scan field. Thus, this technique can also provide a significant power savings for the scanning laser device.

While the scanning laser device 400 illustrated in FIG. 4C provides a scan field 410 with three different effective ranges, this is just one example implementation and others are possible. Turning now to FIG. 4E, another schematic view of a scanning laser device 400 with dynamic range shaping is illustrated. Specifically, FIG. 4E shows the scanning laser device 400 that is implemented to provide a scan field 420 that has five different effective ranges over different angular regions of the scan field 420. Again, such dynamic range shaping can be accomplished by implementing the scanning laser device 400 to adjust the pulse energy at different points within the scan trajectory in a way that provides the desired range and compensates for optical expansion.

Figure 4F:
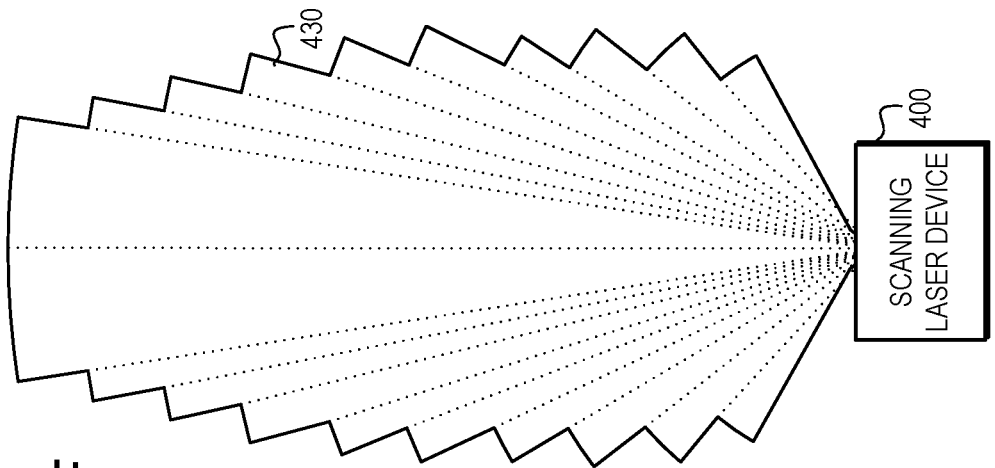
Figure 4E:
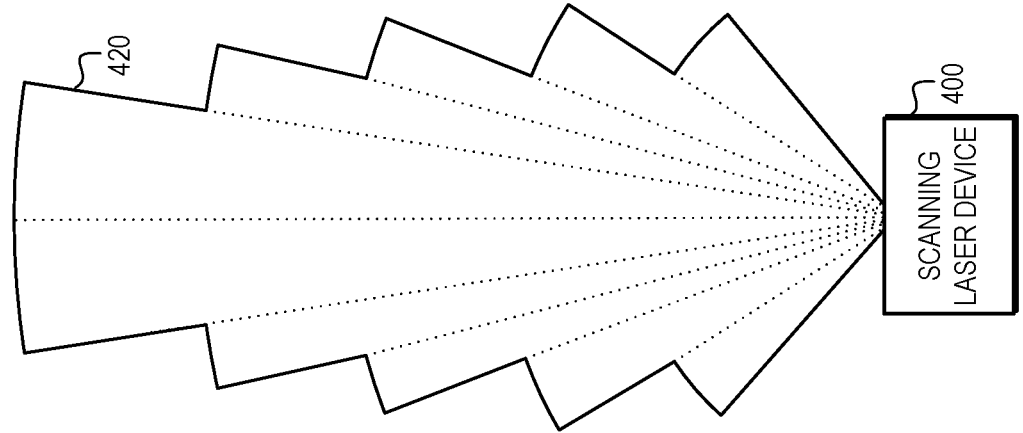

Turning now to FIG. 4F, another schematic view of a scanning laser device 400 with dynamic range shaping is illustrated. Specifically, FIG. 4F shows the scanning laser device 400 that is implemented to provide a scan field 430 that has ten different effective ranges over different angular regions of the scan field 430. Again, such dynamic range shaping can be accomplished by implementing the scanning laser device 400 to adjust the pulse energy at different points within the scan trajectory in a way that provides the desired range and compensates for optical expansion.

Figure 4H:
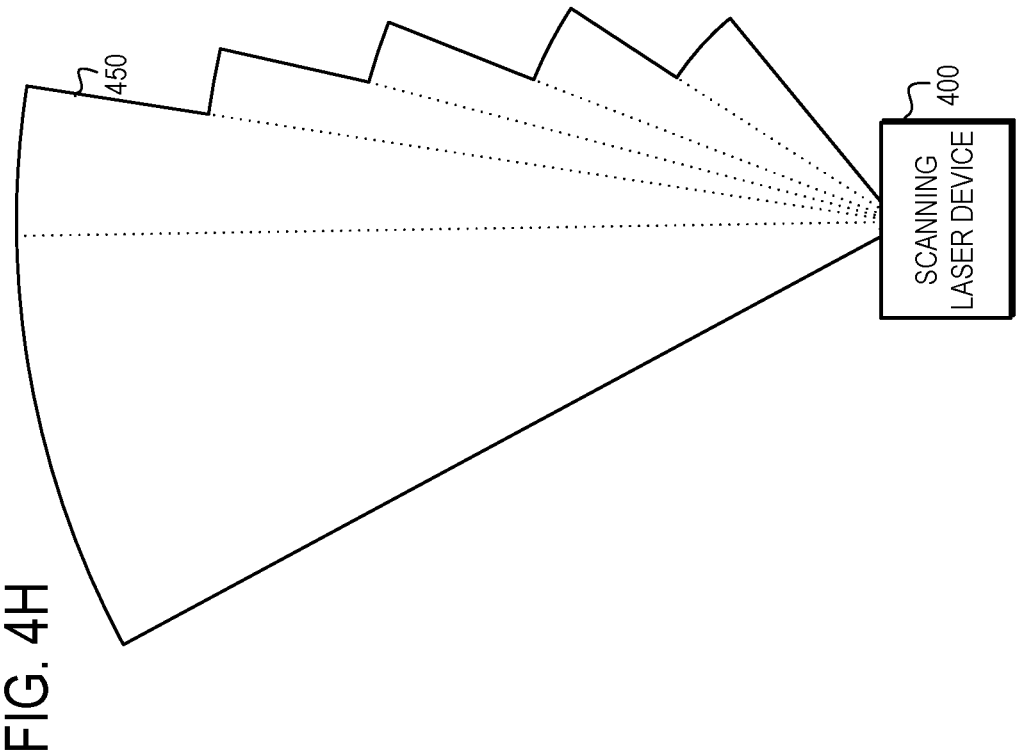
Figure 4G:
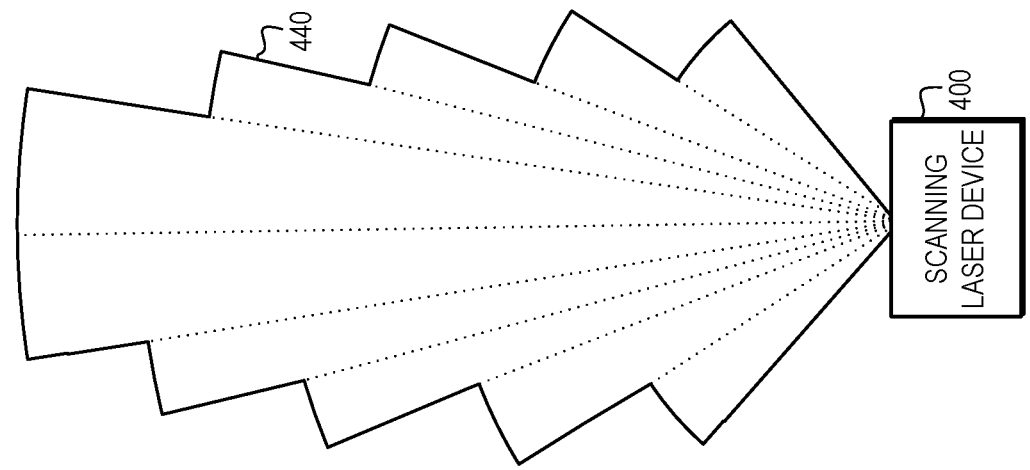

Turning now to FIG. 4G, another schematic view of a scanning laser device 400 with dynamic range shaping is illustrated. Specifically, FIG. 4G shows the scanning laser device 400 that is implemented to provide an asymmetrical scan field 440. In this embodiment the scan field 440 has five different effective ranges on each have of the scan field 440. Notably, the angular extents and range of each of the different regions can be different. Again, such dynamic range shaping can be accomplished by implementing the scanning laser device 400 to adjust the pulse energy at different points within the scan trajectory in a way that provides the desired range and compensates for optical expansion. Turning now to FIG. 4H, another schematic view of a scanning laser device 400 with dynamic range shaping is illustrated. Specifically, FIG. 4F shows the scanning laser device 400 that is implemented to provide an asymmetrical scan field 450 with different regions having different effective ranges only on one side of the scan field 450. In this embodiment the scan field 440 has five different effective ranges on each have of the scan field 440. Again, such dynamic range shaping can be accomplished by implementing the scanning laser device 400 to adjust the pulse energy at different points within the scan trajectory in a way that provides the desired range and compensates for optical expansion.

Again, it should be noted that in each of these embodiments the scanning laser device 400 is able to achieve significant power savings compared to a device that simply uses full energy level pulses over entire the scan field. Thus, these various embodiments can also provide a significant power savings for the scanning laser device while providing the desired scan coverage. It should be noted that the various examples of dynamic range shaping illustrated in FIGS. 4C and 4E-4H are just some examples, and that many other implementations with different resulting scan fields are possible.

Figure 5A:
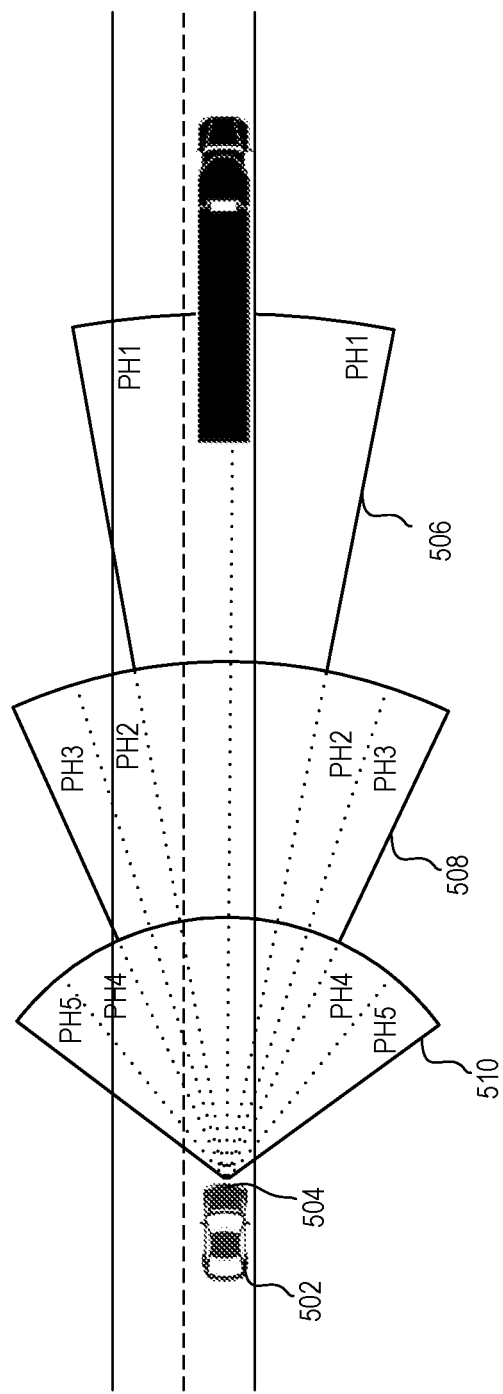
FIGS. 5A and 5B shows top and side views of a moving platform includes a LiDAR system and resulting scan fields in accordance with various embodiments of the present invention.
Figure 5B:
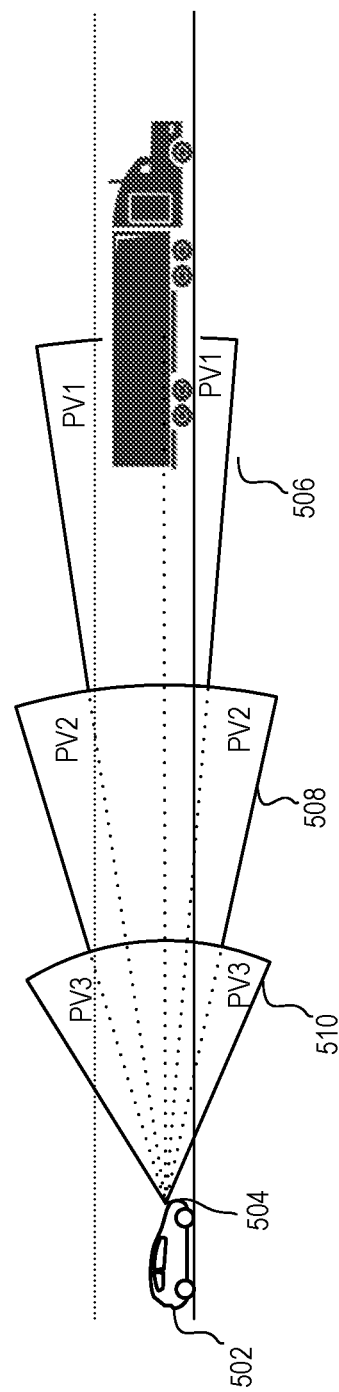

Turning now to FIGS. 5A and 5B, one application of a scanning laser device (e.g., scanning laser device 100) is illustrated. Specifically, FIGS. 5A and 5B illustrate a moving platform with scanning LiDAR system in accordance with various embodiments. Automobile 502 is a movable platform upon which a LiDAR system 504 is mounted. The LiDAR system is implemented using the various embodiments discussed above. (e.g., scanning laser device 100 of FIG. 1) or any of the scanning laser devices and LiDAR systems discussed herein. As such, the LiDAR system 504 is implemented with expansion optics that provides non-uniform optical expansion (e.g., expansion optics 108) and a laser light source controller that varies the energy level in a manner proportional to the non-uniform variation in optical expansion. Specifically, in this example, the LiDAR system 504 is implemented with expansion optics that provides this non-uniform optical expansion in the horizontal axis, but not in the vertical axis.

The LiDAR system 504 generates an exemplary scan field where different horizontal regions have different effective ranges. Specifically, as illustrated in FIGS. 5A and 5B the LiDAR system 504 can be implemented to selectively facilitate long range regions 506, intermediate range regions 510 and short range regions 510, with each of these regions having different angular extents. Again, this can be accomplished by operating the LiDAR system 504 in three different range modes, where the three different range modes have different angular fields of view as was illustrated in FIG. 4A. Alternatively, this can be accomplished by operating the LiDAR system 504 to provide dynamic range shaping with different regions having different effective ranges as illustrated in FIGS. 4C and 4E-4H.

To implement these different ranges in the LiDAR system 504 a light source controller would vary the energy levels of the laser light pulses to compensate for the optical expansion of the expansion optics and the different desired ranges. Notably, in some embodiments significant and/or non-uniform optical expansion is provided only in one axis, and the other axis is not subjected to significant optical expansion. In those embodiments any variation in pulse energy to compensate for the optical expansion would only occur in the one axis with significant optical expansion. In the example of FIGS. 5A and 5B, non-uniform optical expansion is provided only the horizontal axis. Thus, in the vertical axis the energy levels would vary only as needed to achieve the desired ranges.

Figure 5C:
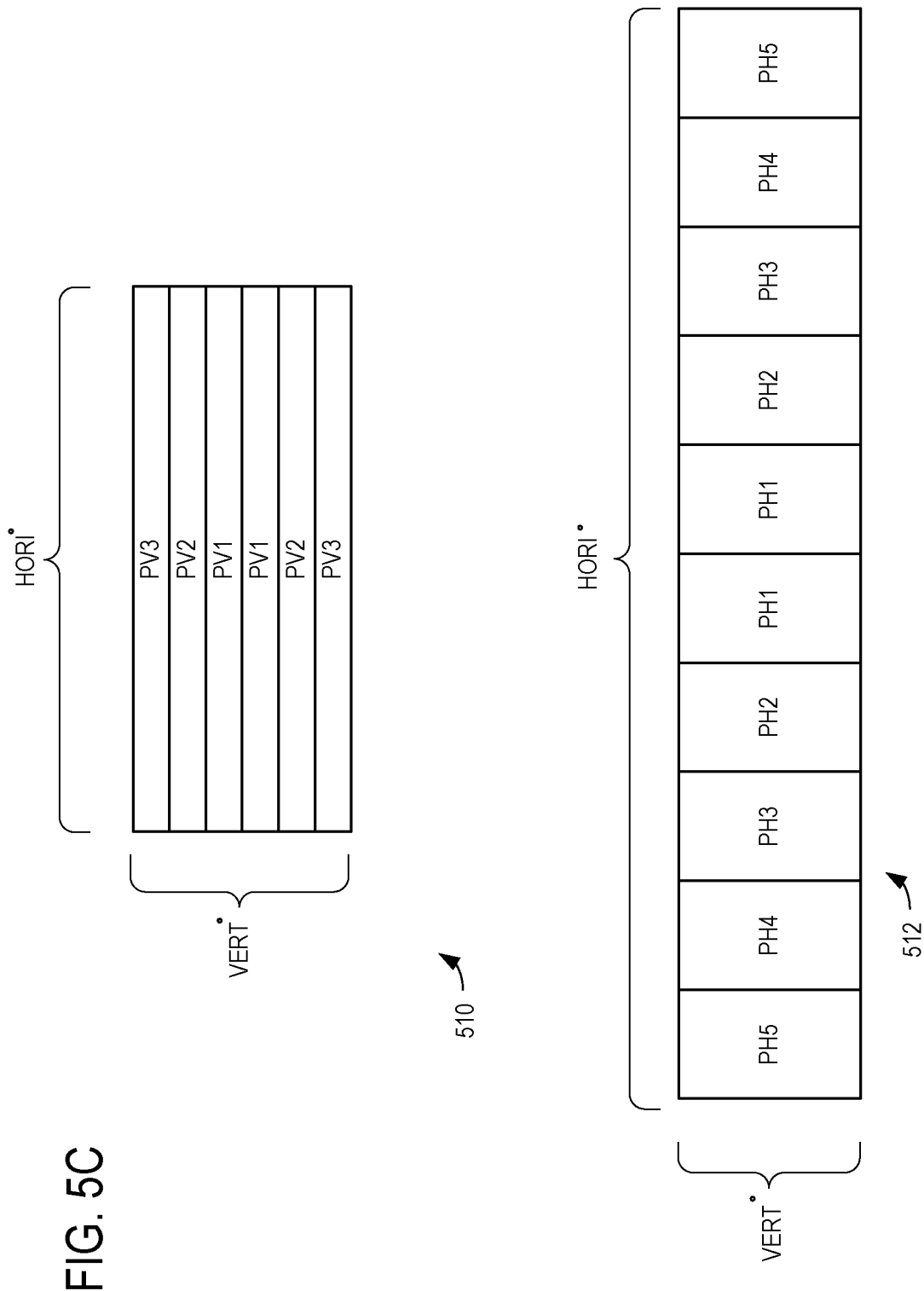

Turning now to FIGS. 5C and 5D, tables 510, 512 and 514 illustrated how such a variation in energy levels can be implemented in a scanning laser device that uses dynamic range shaping. Specifically, the table 510 shows how energy levels could be varied along the vertical axis using adjustment factors PV1, PV2, and PV3. These adjustment factors provide for the desired range in the corresponding vertical regions. Likewise, the table 512 shows how energy levels could be varied along the horizontal axis using adjustment factors PH1, PH2, PH3, PH4 and PH5. These adjustment factors provide for the desired ranges in the corresponding horizontal regions while compensating for the non-uniform expansion in the horizontal axis.

As one specific example, the vertical adjustment can be implemented as follows: PV1=1.0, PV2=0.60, PV3=0.30. Again, these adjustment factors are substantially uniform as they are used to dynamic range shape in the vertical axis and do not provide any adjustment for non-uniform optical expansion. The horizontal adjustment can be implemented as follows: PH1=1.0, PH2=0.75, PH3=0.90, PH4=0.55, PH5=0.80. These adjustment factors are non-uniform reflecting the compensation for both range and non-uniform optical expansion in the horizontal axis.

Finally, table 514 shows how the energy levels could be varied over the whole scanning region using the combined adjustment factors. Specifically, multiplying the corresponding horizontal and vertical adjustments factors results in a combined adjustment factor that can be used to compensate the energy level for that horizontal and vertical region.

It should again be noted that this is just one example of how the horizontal and vertical adjustment factors can be used together to modify the pulse energy levels. For example, in other embodiments the horizontal and vertical adjustments factors can be combined using other mathematical combination techniques (using a weighted average of adjustment factor). And in yet other embodiments the energy levels could be varied by selecting the higher or lower of the horizontal and vertical adjustment factors.

Figure 6:
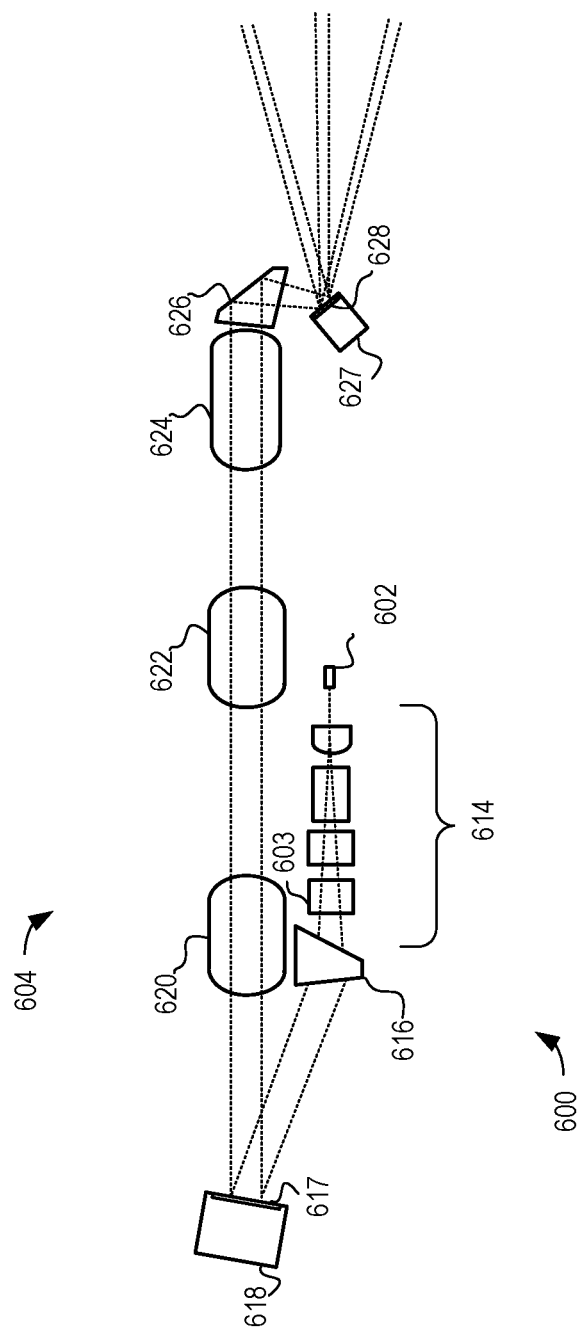
FIGS. 6 and 7 show side and top views of a scanning laser device in accordance with various embodiments of the present invention.
Figure 7:
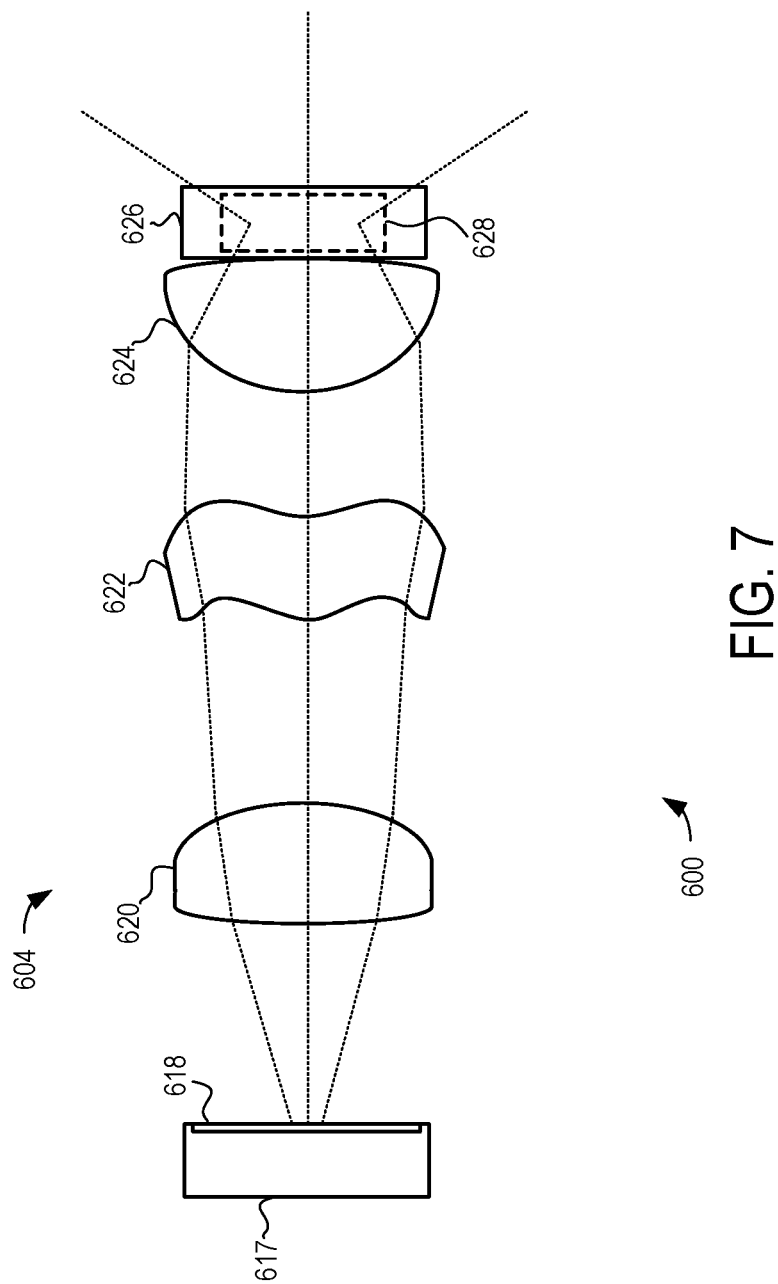

Turning now to FIGS. 6 and 7, side and top views of a scanning laser device 600 are illustrated. In one embodiment, the scanning laser device 600 is a light LiDAR system used for object detection and/or 3D map generation. The scanning laser device 600 includes a laser light source 602 and an optical assembly 604. The optical assembly 604 is one example of the type of optical assembly that can be used in a LiDAR or other scanning laser device (e.g., scanning laser device 100) in accordance with the embodiments described herein. As such, the optical assembly 604 includes a variety of optical elements used to facilitate scanning. It should be noted that FIGS. 6 and 7 are simplified examples, and thus do not show all of the elements or features of a fully implemented scanning laser device or optical assembly.

The optical assembly 604 illustrated in FIG. 6 includes beam shaping optics 614, a first prism 616, a first scanning mirror assembly 617, first scanning mirror(s) 618, expansion optics that include three expansion lenses 620, 622, 624, a second prism 626, a second scanning mirror assembly 627, and second scanning mirror(s) 628.

During operation of scanning laser device 600 the laser light source 602 generates laser light pulses that are scanned by the optical assembly 604 into a scan trajectory (e.g., pattern 112) over a scan field (e.g., scan field 114). For example, the laser light source 602 can comprise one or more infrared (IR) lasers driven by field effect transistors (FETs) to generate IR laser light pulses.

In general, pulses from multiple IR laser light sources are first combined and shaped by the beam shaping optics 614 and associated optical elements. The beam shaping optics 614 can thus include any optics for changing the beam shape of the laser light pulses. For example, the beam shaping optics 614 can include collimating lenses, polarizing combiners, anamorphic prism pairs to improve divergence and other such elements. In one embodiment a pick-off beam splitter or prism 603 is implemented within the beam shaping optics 614 to direct reflections to the detector (not shown in FIGS. 5 and 6) configured for short range pulse detection.

The output of the beam shaping optics 614 is passed to first prism 616 that kicks the beams up to the first scanning mirror 618. In this illustrated embodiment, the first scanning mirror 618 provides for horizontal scanning motion, while the second scanning mirror 628 provides for vertical scanning motion. Furthermore, in this example the first scanning mirror 618 is driven to provide the scanning motion at a relatively slow scan rate, while the second scanning mirror 628 is driven to provide motion at a a relatively slow scan rate. However, these are just examples, and other implementations are possible. Together, this scanning mirror motion results in the laser light pulses being scanned into scan trajectory pattern (e.g., pattern 112). It again should be noted labels "vertical" and "horizontal" used herein are somewhat arbitrary, since a 90 degree rotation of the scanning laser device will effectively switch the horizontal and vertical axes.

The output of the first scanning mirror 618 is passed to the three expansion lenses 620, 622, 624 which together provide the expansion optics. In general, the expansion optics are implemented to provide an expansion of the scan field in the horizontal direction.

Specifically, in this illustrated example the three expansion lenses 620, 622, 624 are implemented to image the output of the first scanning mirror 618 onto the second scanning mirror 628 while providing a non-uniform expansion in the horizontal direction. As one specific example, the first scanning mirror 618 can be implemented to provide a scanning angle in the horizontal direction of 40 degrees, and the expansion lenses 620, 622, 624 can be implemented to provide a non-uniform expansion to expand the scanning angle to 110 degrees.

As noted above, the expansion lenses 620, 622, 624 can be implemented to provide a non-uniform horizontal expansion. In general, the non-uniform expansion is one where the expansion optics provides a non-uniform variation in optical expansion relative to position along a first axis of the IR laser light pulses in the scan field. For example, the amount of expansion can increase or decrease non-uniformly along the horizontal axis.

In one specific example, the three expansion lenses 620, 622, 624 implement a 4F optical system that images the output of the first scanning mirror 618 onto the second scanning mirror 628. Specifically, the three expansion lenses 620, 622, 624 provide a 4F optical system with magnification that varies with the angle coming from the first scanning mirror 618. The result of these three expansion lenses 620, 622, 624 is a non-uniform variation in optical expansion of the exit scan angle provided by the first scanning mirror 618. The second prism 626 receives the output of the third expansion lens 624 and directs the beams to the second scanning mirror 628.

Figure 8:
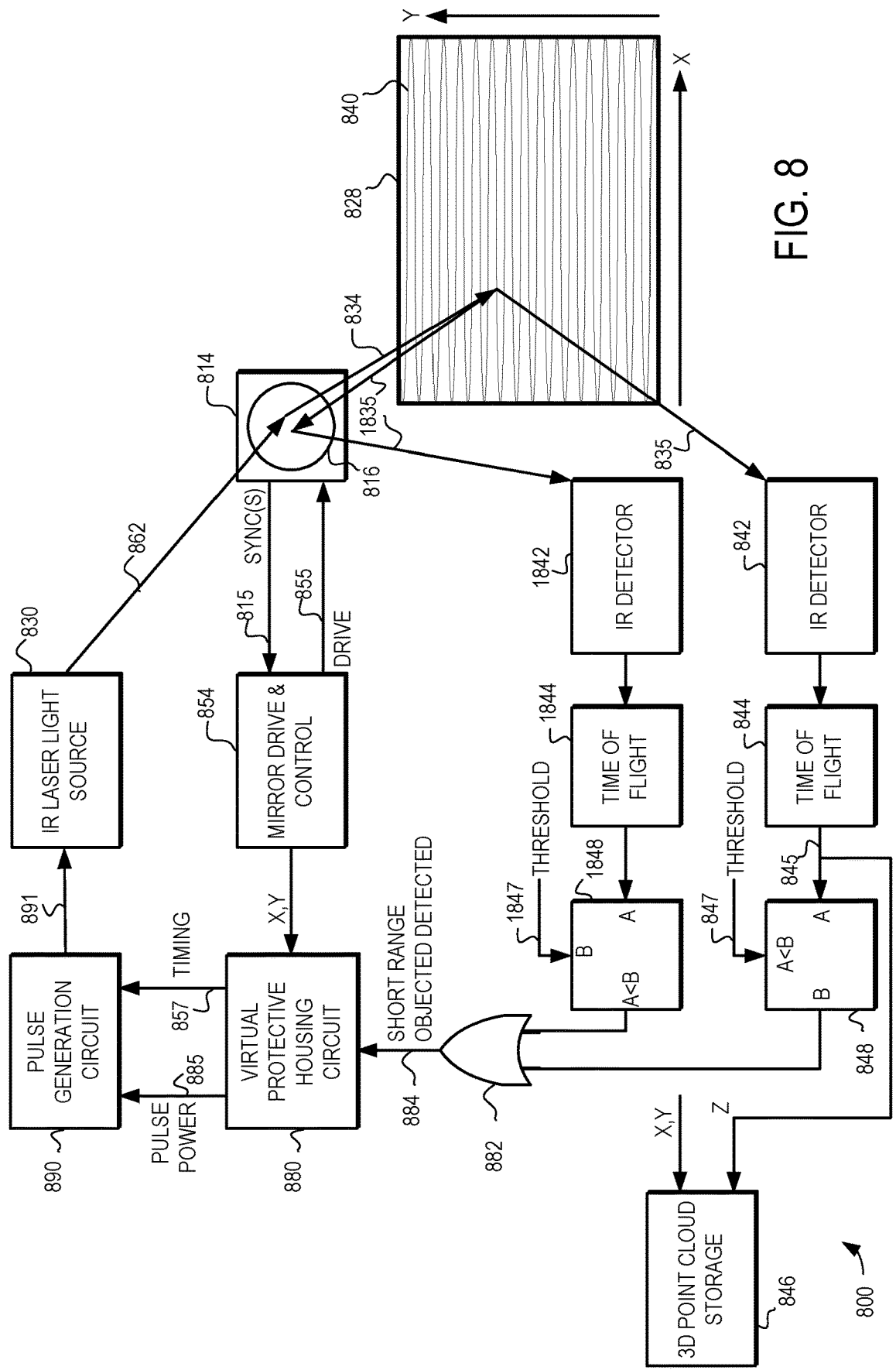
FIG. 8 shows a schematic view of a LiDAR system in accordance with various embodiments of the present invention.

Turning now to FIG. 8, a scanning light detection and ranging (LiDAR) system 800 in accordance with various embodiments is illustrated. The LiDAR system 800 is another example of the type of scanning laser device that can be implemented in accordance with the embodiments described herein. System 800 includes pulse generation circuit 890, infrared (IR) laser light source 830, scanning mirror assembly 814 with scanning mirror(s) 816, and mirror drive and control circuit 854. System 800 also includes first infrared (IR) detector 842, first time-of-flight (TOF) measurement circuit 844, 3D point cloud storage circuit 886, first comparator 848, and virtual protective housing circuit 880. System 800 also includes second IR detector 1842, second TOF measurement circuit 1844, and second comparator 1848. As will be described in greater detail below, the second IR detector 1842 can be implemented to provide redundant short range detection.

Laser light source 830 may be a laser light source such as a laser diode(s) or the like, capable of emitting a laser beam pulses 862. The beam pulses 862 impinge on a scanning mirror assembly 814 which in some embodiments is part of a microelectromechanical system (MEMS) based scanner or the like, and reflects off of scanning mirror 816 to generate controlled output beam pulses 134. In some embodiments, optical elements are included in the light path between laser light source 830 and mirror(s) 816. For example, system 800 may include collimating lenses, dichroic mirrors, expansion optics, or any other suitable optical elements. And as was described above, the scanning mirrors, expansion optics, and other elements can cause back reflections of laser light pulses toward the second IR detector 1842 during operation of the system 800.

A scanning mirror drive and control circuit 854 provides one or more drive signal(s) 855 to control the angular motion of scanning mirror(s) 816 to cause output beam pulses 134 to traverse a scan trajectory 840 in a scan field 828. In operation, laser light source 830 produces modulated light pulses in the nonvisible spectrum and scanning mirror(s) 816 reflect the light pulses as beam 834 traverses scan trajectory 840.

In some embodiments, scan trajectory 840 is formed by combining a sawtooth component on the horizontal axis and a sinusoidal component on the vertical axis. In still further embodiments, the horizontal sweep is also sinusoidal. The various embodiments of the present invention are not limited by the waveforms used to control the vertical and horizontal sweep or the resulting scan trajectory pattern. One axis (e.g., horizontal) is the slow scan axis, and the other axis is the fast-scan axis.

Although scanning mirror(s) 816 are illustrated as a single mirror that scans in two axes, this is not a limitation of the present invention. For example, in some embodiments, mirror(s) 816 is implemented with two separate scanning mirrors, one scanning in one axis, and a second scanning in a second axis.

In some embodiments, scanning mirror(s) 816 include one or more sensors to detect the angular position or angular extents of the mirror deflection (in one or both dimensions). For example, in some embodiments, scanning mirror assembly 814 includes a piezoresistive sensor that delivers a voltage that is proportional to the deflection of the mirror on the fast-scan axis. Further, in some embodiments, scanning mirror assembly 814 includes an additional piezoresistive sensor that delivers a voltage that is proportional to the deflection of the mirror on the slow-scan axis. The mirror position information is provided back to mirror drive and control circuit 854 as one or more SYNC signals 815. In these embodiments, mirror drive and control circuit 854 includes one or more feedback loops to modify the drive signals in response to the measured angular deflection of the mirror. In addition, in some embodiments, mirror drive and control circuit 854 includes one or more phase lock loop circuits that estimate the instantaneous angular position of the scanning mirror based on the SYNC signals.

Mirror drive and control circuit 854 may be implemented using functional circuits such as phase lock loops (PLLs), filters, adders, multipliers, registers, processors, memory, and the like. Accordingly, mirror drive and control circuit 854 may be implemented in hardware, software, or in any combination. For example, in some embodiments, control circuit 854 is implemented in an application specific integrated circuit (ASIC). Further, in some embodiments, some of the faster data path control is performed in an ASIC and overall control is software programmable.

The system 800 includes two separator IR detectors, TOF measurement circuits and comparators for detecting IR laser pulses. Specifically, the system 800 includes a first IR detector 842 and a second IR detector 1842. In general, the first IR detector 842 is implemented to detect reflections from both short range and long range pulses, while the second IR detector provides for the redundant detection of reflections from low power short range pulses to provide increased eye safety.

First IR detector 842 includes one or more photosensitive devices capable of detecting reflections of IR laser light pulses. For example, first IR detector 842 may include one or more PIN photodiodes, Silicon photomultipliers (SiPM), avalanche photodiodes (APD), or the like. Each point in the field of view that is illuminated with an IR laser light pulse (referred to herein as a "measurement point") may or may not reflect some amount of the incident light back to first IR detector 842. If first IR detector 842 detects a reflection, IR detector 842 provides a signal 843 to first TOF measurement circuit 844.

First TOF measurement circuit 844 measure times-of-flight (TOF) of IR laser light pulses to determine distances to objects in the field of view. In some embodiments, virtual protective housing circuit 880 provides a timing signal (not shown) corresponding to the emission time of a particular IR laser light pulse to first TOF measurement circuit 844, and first TOF measurement circuit 844 measures the TOF of IR laser light pulses by determining the elapsed time between the emission of the pulse and reception of the reflection of the same pulse.

First TOF measurement circuit 844 may be implemented using any suitable circuits. For example, in some embodiments, first TOF measurement circuit 844 includes an analog integrator that is reset when the IR pulse is launched, and is stopped when the reflected pulse is received. First TOF measurement circuit 844 may also include an analog-to-digital converter to convert the analog integrator output to a digital value that corresponds to the time-of-flight (TOF) of the IR laser pulse, which in turn corresponds to the distance between system 800 and the object in the field of view from which the light pulse was reflected.

3D point cloud storage device 846 receives X,Y data from mirror drive and control circuit 854, and receives distance (Z) data on node 845 from first TOF measurement circuit 844. A three-tuple (X,Y,Z) is written to 3D point cloud storage device for each detected reflection, resulting in a series of 3D points referred to herein as a "point cloud." Not every X,Y measurement point in the field of view will necessarily have a corresponding Z measurement. Accordingly, the resulting point cloud may be sparse or may be dense. The amount of data included in the 3D point cloud is not a limitation of the present invention.

3D point cloud storage device 846 may be implemented using any suitable circuit structure. For example, in some embodiments, 3D point cloud storage device 846 is implemented in a dual port memory device that can be written on one port and read on a second port. In other embodiments, 3D point cloud storage device 846 is implemented as data structures in a general purpose memory device. In still further embodiments, 3D point cloud storage device 846 is implemented in an application specific integrated circuit (ASIC).

First comparator 848 compares the distance data (Z) on node 845 to a threshold value, and if the distance is less than the threshold value, then first comparator 848 asserts the short range object detection signal on the input to OR gate 882. The short range object detection signal passes through OR gate 882 to the VPH circuit 880 to indicate the detection of an object within a "short range," where "short range" is determined by the value of the threshold on node 847. For example, if the threshold is set to a value corresponding to a distance of five meters, and the detected distance is lower than that threshold, then an object closer than five meters has been detected, and VPH circuit 880 will be notified by the short range object detection signal on node 884.

The threshold value at node 847 and the corresponding short range distance may be modified by VPH circuit 880 based on any criteria. For example, the threshold may be a function of IR laser pulse power, pulse duration, pulse density, wavelength, scanner speed, desired laser safety classification, and the like. The manner in which the threshold value is determined is not a limitation of the present invention.

The second IR detector 1842, second TOF measurement circuit 1844, and second comparator 1848 operate to provide a redundant short range object detection capability. Redundant short range object detection provides an additional measure of safety. For example, if one or the IR detectors, TOF measurement circuits, or comparators should fail, the redundancy will ensure continued safe operation.

Notably, the first IR detector 842 and the second IR detector 1842 receive reflected light pulses through different optical paths. Specifically, the first IR detector 842 receives reflected light along a separate path shown at 835 while the second IR detector 1842 shares at least part of an optical path with the emitted light pulses. Specifically, the reflected light from the scan field is reflected back through at least some of the mirror(s) 816, expansion optics, and other elements in the optical assembly to reach second IR detector 1842 along path 1835.

The second TOF measurement circuit 1844 measure times-of-flight (TOF) of IR laser light pulses to determine distances to objects in the field of view in a manner similar to that of the first TOF measurement circuit 844. Thus, the second TOF measurement circuit 1844 may be implemented using any suitable circuits as with the first TOF measurement circuit 844.

Likewise, the second comparator 1848 compares the distance data (Z) on node 845 to a threshold value, and if the distance is less than the threshold value, then second comparator 1848 asserts the short range object detection signal on the input to OR gate 882. Again, this short range object detection signal passes through OR gate 882 to the VPH circuit 880 to indicate the detection of an object within a "short range," where "short range" is determined by the value of the threshold on node 1847. For example, if the threshold is set to a value corresponding to a distance of five meters, and the detected distance is lower than that threshold, then an object closer than five meters has been detected, and VPH circuit 880 will be notified by the short range object detection signal on node 884.

Again, the threshold value at node 1847 and the corresponding short range distance may be modified by VPH circuit 880 based on any criteria. For example, the threshold may be a function of IR laser pulse power, pulse duration, pulse density, wavelength, scanner speed, desired laser safety classification, and the like.

In some embodiments, both of the detection and TOF measurement circuits operate to detect short range objects, and only one of the detection and TOF measurement circuits operate to measure long range distance and/or write to the 3D cloud storage device. For example, in embodiments represented by FIG. 8, times-of-flight measured by either TOF measurement circuit 1844 or TOF measurement circuit 1844 may be used to detect a short range object, but only times-of-flight measured by TOF measurement circuit 844 are used to populate the 3D point cloud.

VPH circuit 880 operates to manage accessible emission levels in a manner that allows overall operation to remain eye-safe. For example, in some embodiments, VPH circuit 880 controls whether a "short range pulse" or "long range pulse" is generated by setting a pulse energy value on node 885. The emitted pulse energy may be controlled by one or more of pulse power, pulse duration, or pulse count.

VPH circuit 880 may also control the timing of emitted pulses via the timing signal on node 857. In some embodiments, for every measurement point in the field of view, VPH circuit 880 signals pulse generation circuit 890 to generate a short range pulse that can detect objects with a very high level of confidence out to a distance sufficient to provide a virtual protective housing. As used herein, the term "short range pulse" refers to a pulse that is considered eye-safe at a very short range. For example, in some embodiments, the energy levels of the short range IR laser light pulses may be maintained below the IEC 60825.1 Class 1 Accessible Emissions Limit, such that short range IR laser light pulses can be emitted at every measurement point without risking injury to a human eye.

If an object is detected within the short range distance, the corresponding three-tuple (X,Y,Z) may be written to the 3D point cloud storage device 846, and system 800 provides a virtual protective housing by not emitting any higher energy pulses at that measurement point. If, however, a short range object is not detected, system 800 may emit one or more "long range pulses" that are of higher total energy to detect objects beyond the short range distance. For example, in some embodiments, system 800 may emit a short range IR laser light pulse that is considered eye-safe at a distance of 100 millimeters (mm) that has a 50% probability of detecting a 5% reflective target at 36 meters (m) in bright sunlight. This short range pulse may have a one in 10 billion probability of not detecting a 10% reflective target at a distance of 12 m. Also for example, system 800 may emit a long range pulse capable of detecting objects up to 200 m distant while remaining eye-safe beyond four meters distance. In this example, system 800 may emit short range pulses that have an extremely high probability of detecting objects within four meters, and then emit long range pulses that are capable of detecting objects at 200 meters.

As used herein, the term "long range pulse" refers to one or more pulses with higher total energy than short range pulses. For example, in some embodiments, a single long range pulse may be emitted, and the single long range pulse may have higher energy than a single short range pulse, and in other embodiments, multiple long range pulses may be emitted, and the total energy of the multiple long range pulses may be higher than the single short range pulse.

Virtual protective housing circuit 880 may be implemented using any suitable circuit structures. For example, in some embodiments, VPH circuit 880 may include one or more finite state machines implemented using digital logic to respond to short range object detection and conditionally signal pulse generation circuit 890 to emit long range pulses. Further, in some embodiments, VPH circuit 880 may include a processor and memory to provide software programmability of short range pulse energy, long range pulse energy, threshold values and the like. The manner in which VPH circuit 880 is implemented is not a limitation of the present invention.

Figure 9:
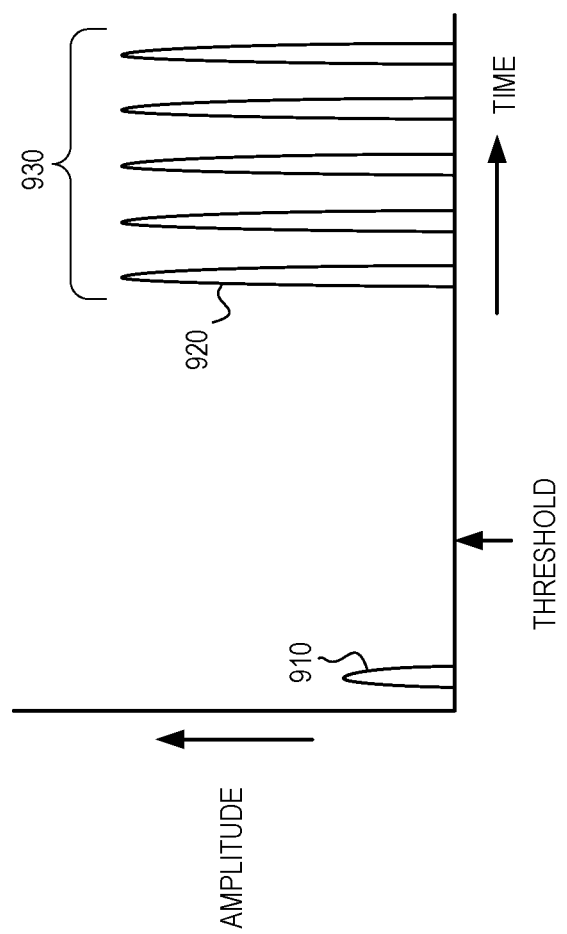
FIG. 9 shows short and long range pulses in accordance with various embodiments of the present invention.

Turning now to FIG. 9, short and long range pulses in accordance with various embodiments of the present invention are illustrated. Short range pulse 910 and long range pulses 930 are examples of IR laser light pulses that may be emitted by a LiDAR (system 800) or other scanning laser device (e.g., scanning laser device 100) at each measurement point. For example, the system may emit short range pulse 910 and then conditionally emit one or more of long range pulses 930 based on whether a short range object is detected. Pulse amplitude is shown on the vertical axis and time is shown on the horizontal axis of the plot in FIG. 9. Short range pulse 910 is shown being emitted at a first time and a threshold is shown representing a second time. The difference between the first and second times represents the short range distance. For example, in some embodiments, the threshold is set at approximately 33 nanoseconds (ns) corresponding to a short range distance of substantially five meters. In some embodiments, short range pulse 910 has an energy level that is considered eye-safe at a very short distance. For example, short range pulse 910 may be eye-safe at 100 mm from the system 800 from which it is emitted.

In some embodiments, if a short range object is detected, the system does not emit any long range pulses for that measurement point, and the detected distance is written to the 3D point cloud. On the other hand, if a short range object is not detected, one or more long range pulses 930 is emitted in a manner that maintains accessible emissions at an eye-safe level. For example, short range pulse 910 may have an energy level that provides a very high probability of detecting an object within the short range distance, and long range pulse 920 may have a total energy level that is eye-safe at the short range distance and beyond. Long range pulses can follow shortly after the threshold time if no short range object is detected. For example, long range pulse 920 may be emitted within 100 ns of the threshold time, or at 133 ns. The times corresponding to the threshold and emission of long range pulses may be different in various embodiments based on the desired short range distance and processing times, and are not a limitation of the present invention.

In some embodiments, a single long range pulse 920 is emitted, and in other embodiments a train of long range pulses 930 is emitted for each measurement point. The number of long range pulses emitted at a single measurement point is not a limitation of the present invention. For example, in some embodiments, a single long range pulse may be emitted, where the single long range pulse has a higher energy than the short range pulse. Also for example, in some embodiments, multiple long range pulses may be emitted, and each long range pulse may have an energy level that is the same as the short range pulse, but the total energy of the multiple long range pulses is greater than the energy of the short range pulse.

Any number of pulses at any energy level may be employed to define multiple ranges. For example, a short range may be defined by the energy of a single short range pulse. Also for example, a medium range may be defined by multiple pulses, each having the same energy as the short range pulse, and a long range may be defined by one or more long range pulses with the same or greater energy as the short range pulse.

In some embodiments, a short range pulse is emitted at every measurement point, and in other embodiments, short range pulses are not emitted at every measurement point. For example, a short range pulse may be emitted at a first measurement point, and if a short range object is not detected, then long range pulses may be emitted at one or more subsequent measurement point without first emitting a short range pulse. This is possible in some embodiments, in part, because measurement points may be defined sufficiently close to one another to enable a valid assumption that when no short range object occupies a measurement point, no short range object occupies some number of subsequent measurement points.

In general, measurement points are points on the scan trajectory at which the scanning laser device measures distance. For example, in some embodiments, a LiDAR system emits a short range pulse at each measurement point to detect if an object is within the short range distance and then conditionally emit one or more long range pulses as described above. Thus, the term "measurement point" as used herein is not meant to designate an infinitely small point in space, but rather a small and finite continuous section of the scan trajectory. Specifically, an IR laser light beam traverses a finite section of the scan trajectory during the round trip transit times of a short range pulse and long range pulse at each measurement point. The measurement point area is also a function of laser spot size (initial size and divergence) at the distance where it encounters an object. Accordingly, the "measurement point" encompasses an area, albeit very small, and the size and location of the area may be a function of many factors.

The embodiments described herein facilitate the reliable detection of these short range pulses. Again, as described above, in some embodiments the system may emit short range pulse 910 and then conditionally emit one or more of long range pulses 930 based on whether a short range object is detected. In such systems it is desirable to facilitate the reliable detection of short range pulses so that long range pulses can be consistently emitted to provide long range object detection. Returning now to FIG. 8, the second IR detector 1842 can be implemented to facilitate the reliable detection of these low energy short range pulses.

As such, the second IR detector 1842 can be implemented with multiple sensors configured to receive reflections through at least some of the same scanning mirror assembly 814, beam shaping optics, and other optical elements used to scan the laser light pulses into the scan field. Because the same optical assembly is used by the multiple sensors to receive the laser light reflections any damage or blockage that prevents the multiple sensors from receiving the reflections from short range pulses would also have likely blocked the scanning of the laser light pulses into the scan field. Thus, the second IR detector 1842 can more reliably detect short range pulses that have impacted an object in the scan field and reflected back toward the detector, and can thus be used to determine that long range pulses can be emitted safely. Furthermore, the multiple sensors in the second IR detector 1842 are configured to at least partially cancel the effects of back reflections from within the optical assembly. The cancellation of the effects of back reflections from within the optical assembly can improve the sensitivity of the detector, particularly for the detection of low energy short range reflections of laser pulses from within the scan field 828.

In addition, in accordance with the embodiments described herein the pulse generation circuit 890 can be implemented with a laser light controller configured to vary the energy level of the laser light pulses according to position along the first axis of the scan field 828. The variation of the energy level of the laser light pulses is performed provide the desired effective range of the sensor while at least partially compensating for the effects of the non-uniform optical expansion provided by the expansion optics. For example, in one embodiment the light source controller is configured to vary the energy in a manner proportional to the non-uniform variation in optical expansion. Thus, laser light pulses that are subjected to greater optical expansion are generated with greater energy levels. Additionally, the laser light controller can be configured to vary the energy to facilitate different effective ranges in different scan regions of the scan field 828.

Figure 10:
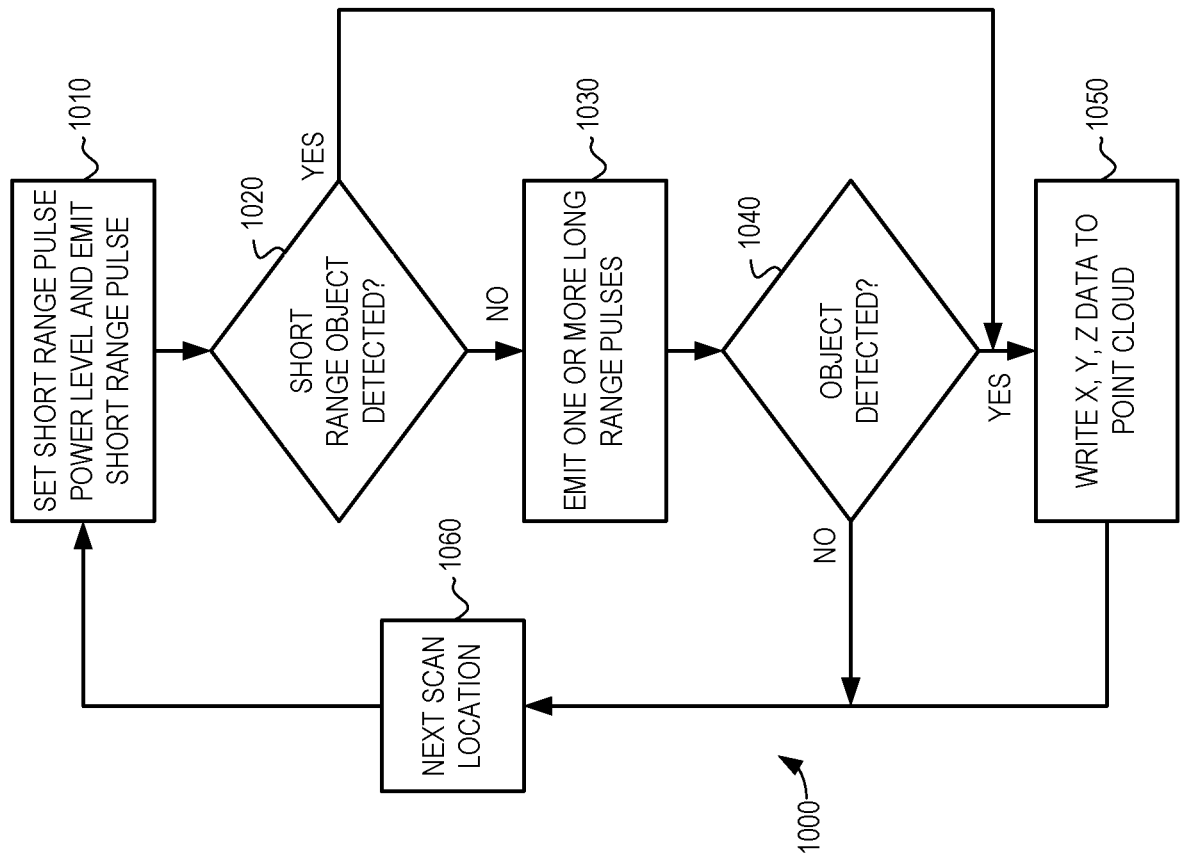
FIG. 10 shows a flow diagram of methods in accordance with various embodiments of the present invention.

Turning now to FIG. 10, a flow diagram of methods in accordance with various embodiments are illustrated. In some embodiments, method 1000, or portions thereof, is performed by a scanning laser device (e.g., LiDAR system 800 of FIG. 8). In other embodiments, method 1000 is performed by a series of circuits or an electronic system. Method 1000 is not limited by the particular type of apparatus performing the method. The various actions in method 1000 may be performed in the order presented, or may be performed in a different order. Further, in some embodiments, some actions listed in FIG. 4. are omitted from method 1000.

Method 1000 is shown beginning with block 1010 in which a short range pulse energy level is set and the short range pulse is emitted. In some embodiments, this corresponds to setting a pulse energy level to a value that will result in eye-safe operation at a particular distance from the LiDAR system. For example, in some embodiments, a short range pulse energy level may be set by a virtual protective housing circuit (e.g., virtual protective housing circuit 880 in FIG. 8) such that accessible emissions result in eye-safe operations at 100 mm, and in other embodiments, the pulse energy level may be set such that accessible emissions result in eye-safe operations at a minimum distance greater than 100 mm.

If a short range object is detected at 1020, then a 3D point (X,Y,Z) may be written to a 3D point cloud storage device such as 3D storage device 846 (FIG. 8). If a short range object is not detected, then one or more long range pulses may be transmitted at 1040. As described above, short range object detection may be accomplished by detecting a reflection of the short rang pulse, measuring the time-of-flight of the detected reflection, and comparing that time-of-flight to a threshold. The value of the threshold corresponding to the short range distance may be set to any suitable value.

At 1030, one or more long range pulses are emitted. If an object is detected at 440, then a 3D point (X,Y,Z) may be written to a 3D point cloud storage device (e.g., 3D storage device 846 in FIG. 8) and processing continues at the next measurement point at 460. If an object is not detected, then processing continues at the next measurement point at 1060 without writing a 3D point to the point cloud storage device.

Figure 11:
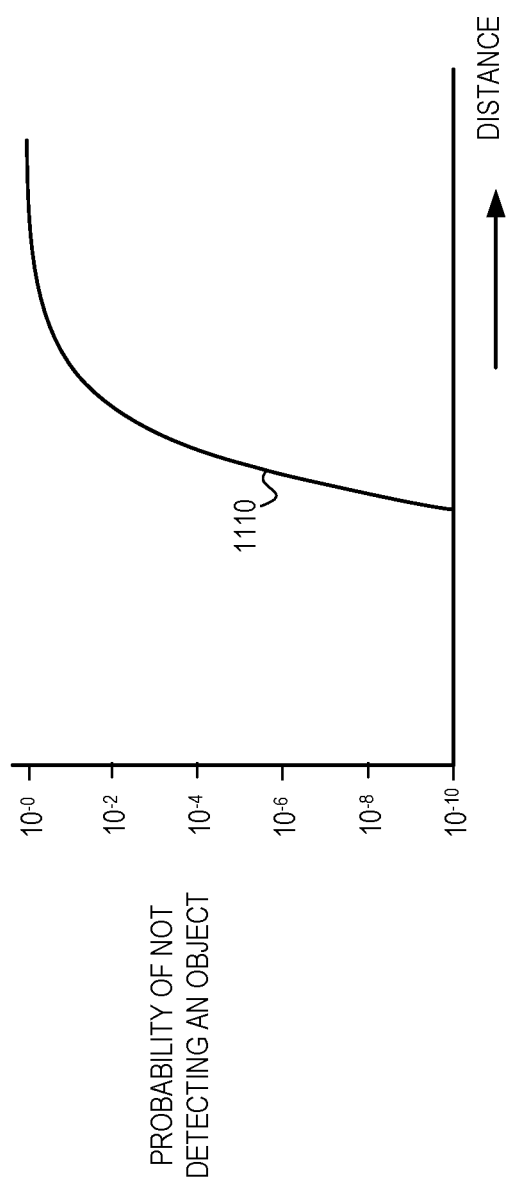
FIG. 11 shows a graph of probability of not detecting an object as function of distance in accordance with various embodiments of the present invention.

Turning now to FIG. 11 a graph illustrates a probability of not detecting an object as a function of distance in accordance with various embodiments. Probability curve 1110 is a typical curve that may shift left or right based on many parameters including pulse energy level, reflectivity of the object, ambient light, etc. For example, in extremely bright sunlight, a short range pulse that is eye-safe at 100 mm may have $10^{-10}$ probability of not detecting an object with a 20% reflectivity at 20 m. This results in an even lower probability of not detecting an object at closer distances, so in this same scenario, a long range pulse that is eye-safe at 5 m provides a very robust virtual protective housing.

In some embodiments, the threshold corresponding to the short range distance and the energy level of the long range pulse(s) are set to values that result in the short range distance and the minimum eye-safe distance of the long range pulse(s) being equal. In other embodiments, the threshold corresponding to the short range distance and the energy level of the long range pulse(s) are set to values that result in the short range distance being greater than minimum eye-safe distance of the long range pulse(s).

Figure 12:
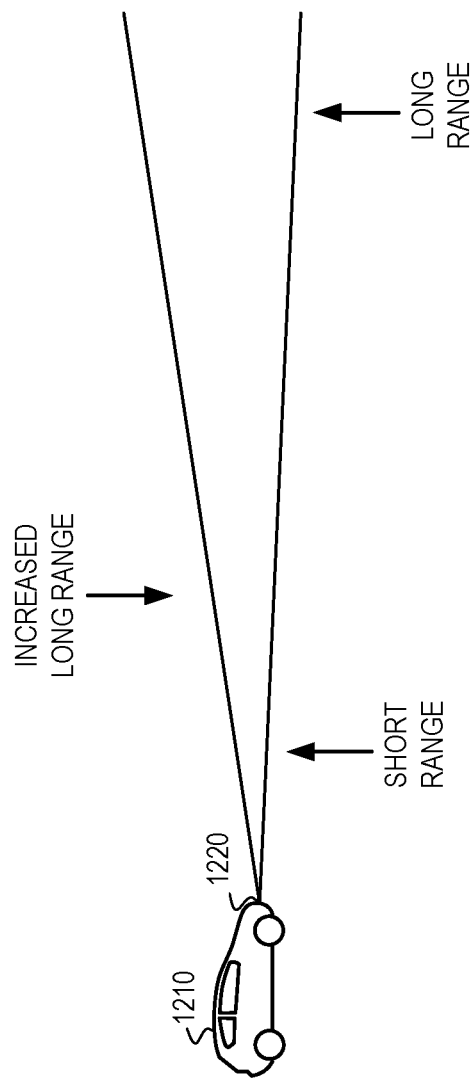
FIG. 12 shows a moving platform with a LiDAR system in accordance with various embodiments of the present invention.

Turning now to FIG. 12, one application of a scanning laser device (e.g., scanning laser device 100) is illustrated. Specifically, FIG. 12 illustrates a moving platform with an eye-safe scanning LiDAR system in accordance with various embodiments. Automobile 1210 is a movable platform upon which an eye-safe LiDAR system 1220 is mounted. In some embodiments, eye-safe LiDAR system 1220 is implemented using the various embodiments discussed herein (e.g., LiDAR system 800 of FIG. 8 or LiDAR system 1300 of FIG. 13) or any of the scanning laser devices discussed herein.

In some embodiments, the energy of short range pulses is increased when the platform upon which the LiDAR system is mounted is in motion. For example, when automobile 1210 has a velocity above a threshold, the energy of short range pulses may have a level that results in accessible emissions eye-safe level at a minimum distance above 100 mm. In some embodiments, the minimum distance at which the accessible emissions result in eye-safe level may be a meter or more. Also for example, the energy of short range pulses may be increased with increased platform velocity. In some embodiments, the energy of short range pulses may be gradually increased as the platform accelerates between 2.5 meters per second (m/s) and 25 m/s.

Increasing the energy level of short range pulses may result in increased probability of detecting objects within the short range and/or increasing the short range within which objects can be detected. FIG. 12 shows an increased short range as a result of increased short range pulse energy.

In some embodiments, the short range pulse energy level is set such that the accessible emissions are eye-safe at a short distance (e.g., 100 mm or less), and the time threshold is set to a value that provides a very low probability of not detecting an object. Then, if a velocity of the moving platform (e.g., an automobile) is not faster than a threshold the short range pulse is emitted. If instead the velocity of the moving platform is faster than a threshold, the short range pulse energy level and the time threshold corresponding to the short range distance can be increased. In some embodiments, the short range pulse energy is increased to a level that results in accessible emissions that result in eye-safe levels at a minimum distance of one meter. In other embodiments, the short range pulse energy is increased to a level that results in accessible emissions that result in eye-safe levels at a minimum distance greater than or less than one meter.

In some embodiments, the velocity of the moving platform can be determined using a velocity sensor on the LiDAR system. In other embodiments, the velocity information can be obtained from a sensor on the moving platform (e.g. a sensor on an automobile).

Figure 13:
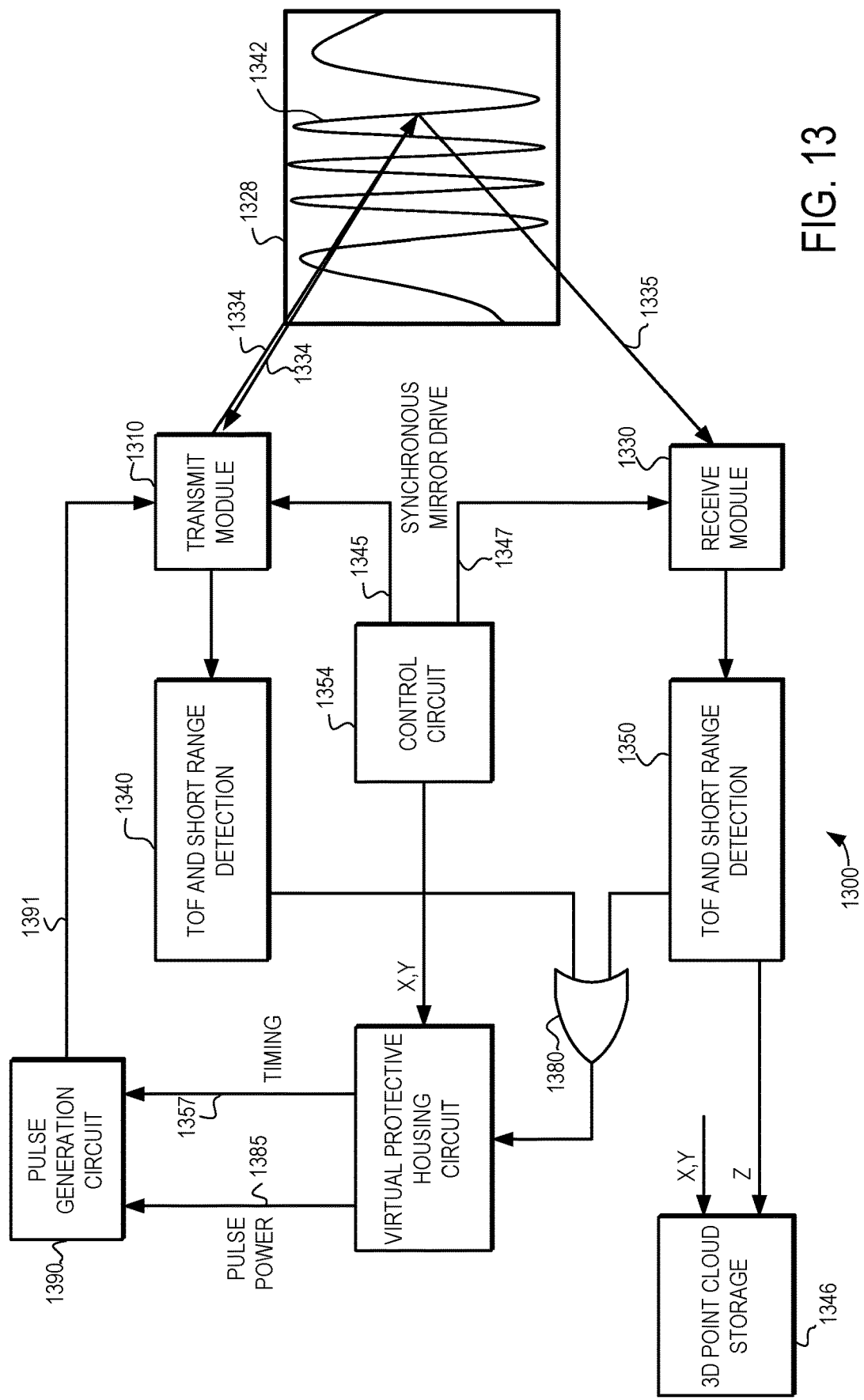
FIG. 13 shows a schematic view of a LiDAR system in accordance with various embodiments of the present invention.

Turning now to FIG. 13, a scanning light detection and ranging (LiDAR) system 1300 in accordance with various embodiments is illustrated. The LiDAR system 1300 is another example of the type of scanning laser device that can be implemented in accordance with the embodiments described herein. LiDAR system 1300 includes VPH circuit 1384, pulse generation circuit 1390, 3D point cloud storage device 1346, OR gate 1380, and control circuit 1354. LiDAR system 1300 also includes transmit module 1310, receive module 1330, TOF and short range detection circuits 1340, and TOF and short range detection circuits 1350.

The LiDAR system 1300 includes two separate IR detectors and TOF and short range detection circuits for detecting reflections of IR laser pulses. Specifically, the receive module 1330 includes a first IR detector implemented to detect reflections from both short range and long range pulses, while the transmit module 1310 includes a second IR detector that provides for the redundant detection of reflections from low power short range pulses to provide increased eye safety.

Transmit module 1310 includes an IR laser light source to produce a pulsed laser beam, collimating and focusing optics, and one or more scanning mirror assemblies implemented together in an optical assembly to scan the pulsed laser beam in two dimensions in the field of view. Transmit module 1310 also includes an IR laser light detector that shares an optical path with emitted IR laser light pulses. Example embodiments of transmit modules are described more fully below with reference to later figures.

Receive module 1330 includes optical devices and one or more scanning mirror assemblies to scan in two dimensions to direct reflected light from the field of view to an included IR light detector. Example embodiments of receive modules are described more fully below with reference to later figures.

Each of TOF and short range detection circuits 1340 and 1350 include a TOF measurement circuit and comparator. For example, TOF and short range detection circuits 1340 may include TOF circuit 1844 and second comparator 1848, and TOF and short range detection circuits 1350 may include TOF measurement circuit 844 and comparator 848 (FIG. 8).

Control circuit 1354 controls the movement of scanning mirrors within transmit module 1310 as described above with reference to FIG. 8. Control circuit 1354 also controls the movement of scanning mirrors within receive module 1330. In operation, control circuit 1354 receives mirror position feedback information (not shown) from transmit module 1310, and also receives mirror position feedback information (not shown) from receive module 1330. The mirror position feedback information is used to phase lock the operation of the mirrors.

Control circuit 1354 drives microelectromechanical (MEMS) assemblies with scanning mirrors within transmit module 1310 with drive signal(s) 1345 and also drives MEMS assemblies with scanning mirrors within receive module 1330 with drive signal(s) 1347 that cause the mirrors to move through angular extents of mirror deflection that define the scan trajectory 1342 and the size and location of scan field 1328. The synchronization of transmit and receive scanning allows the receive aperture to only accept photons from the portion of the field of view where the transmitted energy was transmitted. This results in significant ambient light noise immunity.

As shown in FIG. 13, the two dimensional scanning is performed in a first dimension (vertical, fast scan direction) and a second dimension (horizontal, slow scan direction). The labels "vertical" and "horizontal" are somewhat arbitrary, since a 90 degree rotation of the apparatus will switch the horizontal and vertical axes.

Also, notably in the example of FIG. 13, scan trajectory 1342 is expanded along the horizontal axis with a non-uniform variation in optical expansion. Such an expansion can be implemented through the use of expansion optics as described above. For example, the three expansion lenses 620, 622, and 624 in FIGS. 6 and 7 can be implemented in system 1300. In such an implementation the expansion optics would be implemented in transmit module 1310 provide for the non-uniform expansion in the horizontal direction as the laser light pulses and scanned into the scan field 1328. As illustrated in FIGS. 6 and 7 these three expansion lenses can be implemented between a first scanning mirror 618 and a second scanning mirror 628. Likewise, in such an embodiment corresponding optics (i.e., scanning mirrors and expansion optics) would be implemented in receive module 1330 to provide for a corresponding non-uniform reduction in the optical expansion for received reflections of laser light pulses from the scan field 1328.

Also as described above, the transmit module 1310 can be implemented with a pulse generation circuit 1390 that includes a laser light controller configured to vary the energy level of the laser light pulses according to position along the first axis of the scan field 1328. The variation of the energy level of the laser light pulses is performed provide the desired effective range of the sensor while at least partially compensating for the effects of the non-uniform optical expansion provided by the expansion optics. For example, in one embodiment the light source controller is configured to vary the energy in a manner proportional to the non-uniform variation in optical expansion. Thus, laser light pulses that are subjected to greater optical expansion are generated with greater energy levels. Additionally, the laser light controller can be configured to vary the energy to facilitate different effective ranges in different scan regions of the scan field 1328.

Figure 14:
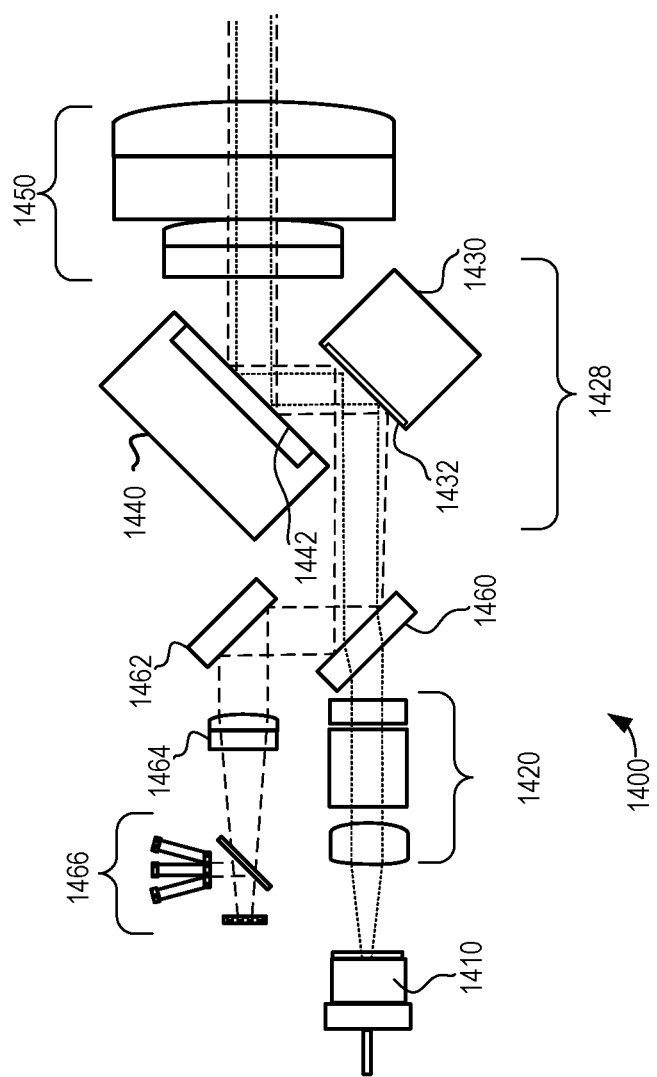
FIG. 14 shows a side view of a transmit module in accordance with various embodiments of the present invention.
Figure 15:
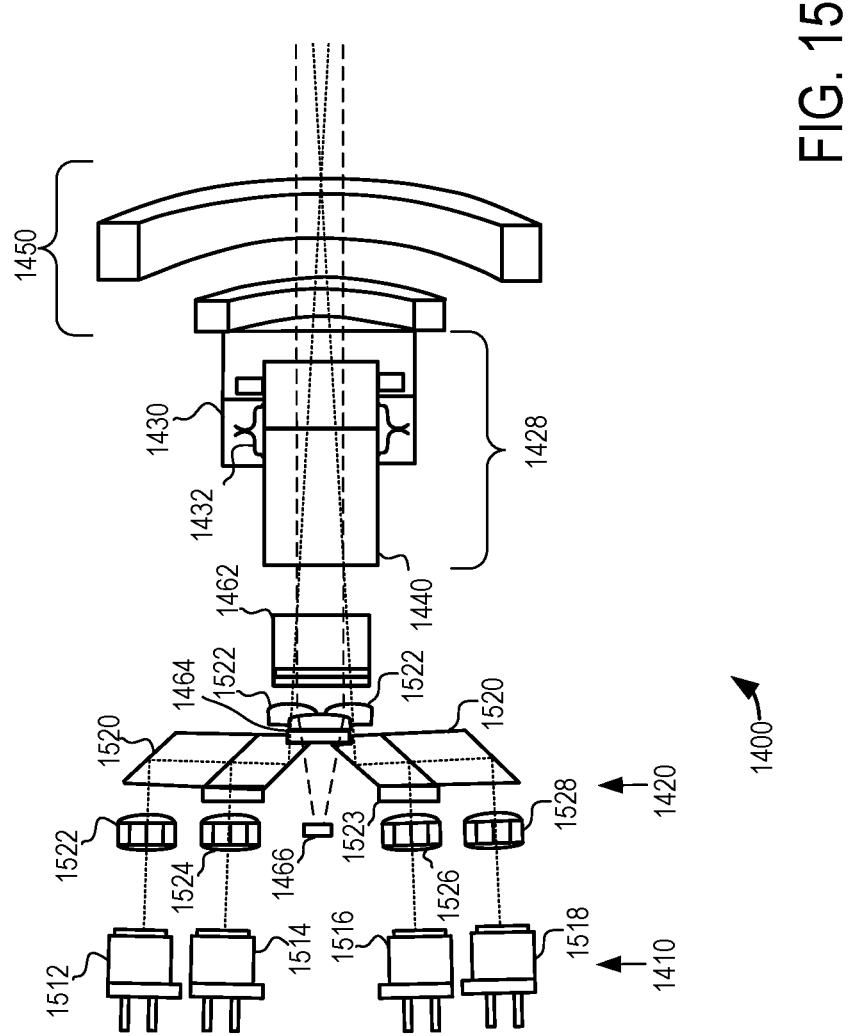
FIG. 15 shows a top view of a transmit module in accordance with various embodiments of the present invention.

Turning now to FIGS. 14 and 15, FIG. 14 shows a side view and FIG. 15 shows a top view of a transmit module 1400. Transmit module 1400 is an example of transmit module that can be used in a LiDAR system (e.g., transmit module 1310 of FIG. 10). Transmit module 1400 includes laser light source 1410, beam shaping optical devices 1420, received energy pickoff device 1460, mirror 1462, beam shaping device 1464, IR detector 1466, scanner 1428, and exit optical devices 1450.

Figure 16:
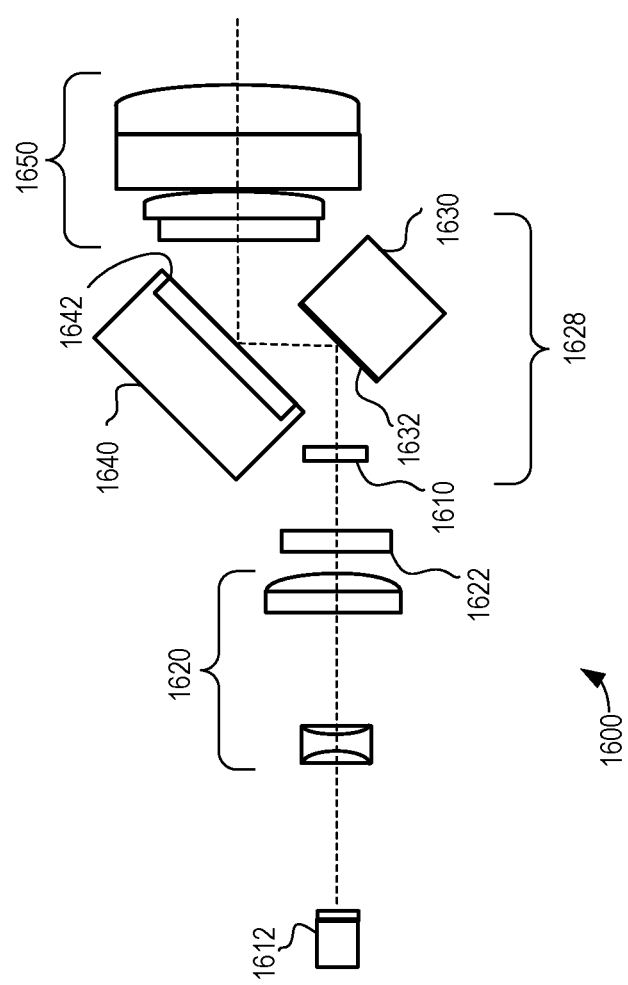
FIG. 16 shows a side view of a receive module in accordance with various embodiments of the present invention.

In some embodiments, laser light source 1410 sources generate nonvisible light such as infrared (IR) light. In these embodiments, IR detector 1466 detects the same wavelength of nonvisible light, as does an IR detector in receive module 1600 (FIG. 16, discussed below). For example, in some embodiments, laser light source 1410 may include a laser diode that produces infrared light with a wavelength of substantially 905 nanometers (nm), and IR detector 1466 detects reflected light pulses with a wavelength of substantially 905 nm. Also for example, in some embodiments, laser light source 1410 may include a laser diode that produces infrared light with a wavelength of substantially 940 nanometers (nm), and IR detector 1466 detects reflected light pulses with a wavelength of substantially 940 nm. The wavelength of light is not a limitation of the present invention. Any wavelength, visible or nonvisible, may be used without departing from the scope of the present invention.

Laser light source 1410 may include any number or type of emitter suitable to produce a pulsed laser beam. For example, in some embodiments, laser light source 1410 includes multiple laser diodes shown in FIG. 15 at 1512, 1514, 1516, and 1518. The pulsed laser light produced by laser light source 1410 is combined, collimated, and focused by beam shaping optical devices 1420 to produce a pulsed laser beam. For example, optical devices 1522, 1524, 1526, 1528 may collimate the laser beams on the fast axis, polarization rotators 1523 and beam combiners 1520 may combine laser beams, and optical devices 1522 may form the pulsed laser beam into a fan on the slow axis. Beam sizes and divergence values are not necessarily uniform across the various embodiments of the present invention; some embodiments have higher values, and some embodiments have lower values.

Scanner 1428 receives the pulsed laser beam from optical devices 1420 and scans the pulsed beam in two dimensions. In embodiments represented by FIGS. 14 and 15, scanner 1428 includes two separate scanning mirror assemblies 1430, 1440, each including a scanning mirror 1432, 1442, where each scanning mirror scans the beam in one dimension. For example, scanning mirror 1432 scans the pulsed beam in the fast scan direction, and scanning mirror 1442 scans the pulsed beam in the slow scan direction.

Although scanner 1428 is shown including two scanning mirror assemblies, where each scans in a separate dimension, this is not a limitation of the present invention. For example, in some embodiments, scanner 1428 is implemented using a single biaxial scanning mirror assembly that scans in two dimensions. In some embodiments, scanning devices uses electromagnetic actuation, achieved using a miniature assembly containing a MEMS die and small subassemblies of permanent magnets and an electrical interface, although the various embodiments are not limited in this respect.

Exit optical devices 1450 operate on the scanning pulsed laser beam as it leaves the transmit module. In some embodiments, exit optical devices 1450 perform field expansion. For example, scanner 1428 may scan through maximum angular extents of 20 degrees on the fast scan axis, and may scan through maximum angular extents of 40 degrees on the slow scan axis, and exit optical devices 1450 may expand the field of view to 30 degrees on the fast scan axis and 120 degrees on the slow scan axis. The relationship between scan angles of scanning mirrors and the amount of field expansion provided by exit optical devices 1450 is not a limitation of the present invention.

Received energy pickoff device 1460 deflects received light (shown as a dotted line) that shares at least part of the transmit optical path with the emitted light pulses (shown as a solid line). The deflected received light is then reflected by mirror 1462, focused by optical device 1064, and detected by IR detector 1466. In some embodiments, pickoff device 1460 includes a "window" that transmits the pulsed beam produced by the IR laser light source, and a reflective outer portion to deflect received energy outside the window. In other embodiments, pickoff device 1460 is a partial reflector that transmits a portion of incident light and reflects the rest. For example, a reflector that transmits 90% of incident light and reflects 10% of incident light will provide the IR detector 1466 with 10% of the light reflected off an object in the field of view. In still further embodiments, pickoff device 1460 may incorporate a polarizing beam splitter that transmits the pulsed laser beam (at a first polarization), and picks off received light of a different polarization. This is effective, in part, due to the reflections being randomly polarized due to Lambertian reflection. In still further embodiments, the outgoing laser beam and received energy may be directed to different portions of the scanning mirrors, and pickoff device 1460 may be an offset mirror positioned to reflect one but not the other.

Again, to facilitate reliable detection of low energy short range pulses the IR detector 1466 can be implemented with multiple sensors configured to receive reflections through at least some of the same optical assembly used to transmit laser light pulses into the scan field. Specifically, the IR detector 1466 can be configured to receive laser light pulses through the same scanning mirrors 1432, 1142, exit optical devices 1450, and other optical elements used to transmit the laser light pulses into the scan field. Because the same optical assembly is used by the multiple sensors to receive the laser light reflections any damage or blockage that prevents the multiple sensors from receiving the reflections from short range pulses would also have likely blocked the scanning of the laser light pulses into the scan field. Thus, the IR detector 1466 can more reliably detect short range pulses that have impacted an object in the scan field and reflected back toward the detector, and can thus be used to reliably determine when long range pulses can be emitted safely. Furthermore, the multiple sensors in the IR detector 1466 are configured to at least partially cancel the effects of back reflections from within the optical assembly. The cancellation of the effects of back reflections from within the optical assembly can improve the sensitivity of the detector, particularly for the detection of low energy short range reflections of laser pulses from within the scan field.

Also as described above, the transmit module 1400 can be implemented with a laser light controller configured to vary the energy level of the laser light pulses according to position along the first axis of the scan field. The variation of the energy level of the laser light pulses is performed provide the desired effective range of the sensor while at least partially compensating for the effects of the non-uniform optical expansion provided by the expansion optics. For example, in one embodiment the light source controller is configured to vary the energy in a manner proportional to the non-uniform variation in optical expansion. Thus, laser light pulses that are subjected to greater optical expansion are generated with greater energy levels. Additionally, the laser light controller can be configured to vary the energy to facilitate different effective ranges in different scan regions of the scan field.

Figure 17:
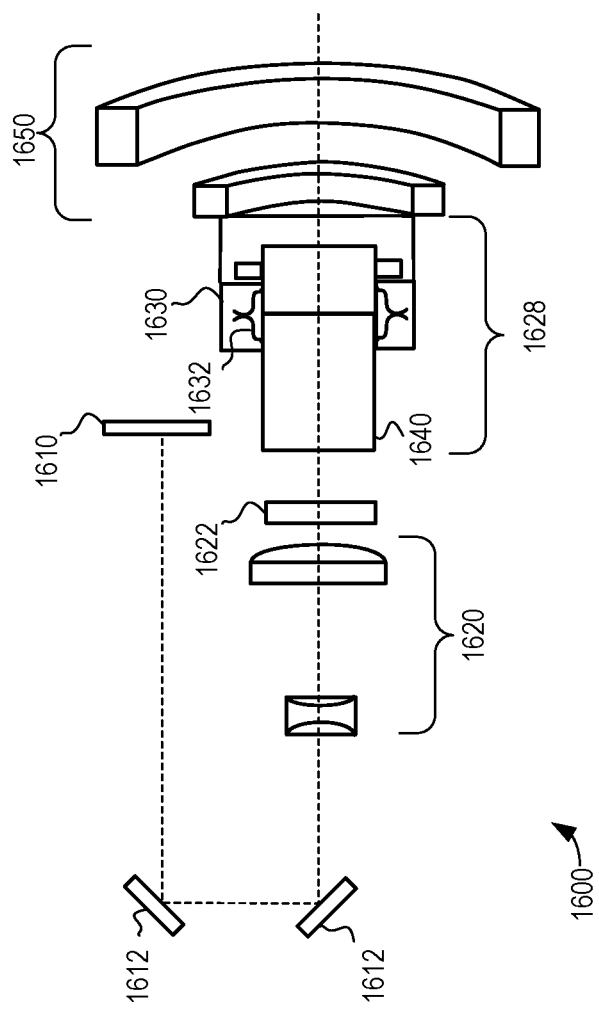
FIG. 17 shows a top view of a receive module in accordance with various embodiments of the present invention.

Turning now to FIGS. 16 and 17, FIG. 16 shows a side view and FIG. 17 shows a top view of a receive module 1600. Receive module 1600 is an example of receive module that can be used in a LiDAR system (e.g., receive module 1330 of FIG. 13). Receive module 1600 includes IR detector 1610, fold mirrors 1612, imaging optical devices 1620, bandpass filter 1622, scanner 1628, and exit optical devices 1650.

Scanning mirror assemblies 1630 and 1640 are similar or identical to scanning mirror assemblies 1430 and 1440, and exit optical devices 1650 are similar or identical to exit optical devices 1450. Bandpass filter 1422 passes the wavelength of light that is produced by laser light source 1410, and blocks ambient light of other wavelengths. For example, in some embodiments, the laser light source produces light at 905 nm, and bandpass filter 1622 passes light at 905 nm.

Imaging optical devices 1620 image a portion of the field of view onto IR detector 1610 after reflection by fold mirrors 1612. Because scanner 1628 is scanned synchronously with scanner 1428, detector 1610 always collects light from the measurement points illuminated by the scanned pulsed beam.

Figure 18:
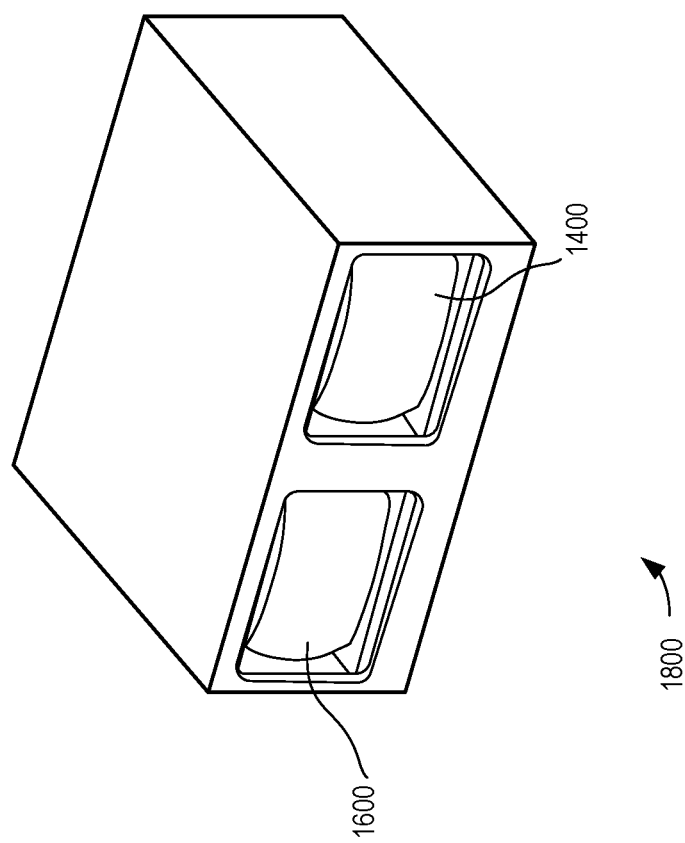
FIG. 18 shows a perspective view of an integrated photonics module in accordance with various embodiments of the present invention.

FIG. 18 shows a perspective view of an integrated photonics module in accordance with various embodiments of the present invention. Integrated photonics module 1800 includes both transmit module 1400 (FIGS. 14 and 15) and receive module 16 (FIGS. 16 and 17). Integrated photonics module 1800 is shown having a rectangular housing with transmit module 1400 and receive module 1600 placed side by side. In some embodiments, transmit module 1400 and receive module 1600 are placed one on top of the other.

In the preceding detailed description, reference was made to the accompanying drawings that show, by way of illustration, specific embodiments in which the invention may be practiced. These embodiments were described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The preceding detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:
1. An apparatus comprising:
  a laser light source configured to produce laser light pulses;
  an optical assembly, the optical assembly including expansion optics and beam scanning optics to scan the laser light pulses into a scan field, wherein the expansion optics provide a non-uniform variation in optical expansion of the laser light pulses relative to position along a first axis in the scan field;
  a detector to detect reflections of the laser light pulses from within the scan field; and
  a light source controller operatively coupled to the laser light source, the light source controller configured to vary energy levels of the laser light pulses according to the position along the first axis in the scan field to form a dynamic range shape comprising a plurality of effective range regions along the first axis, wherein, within each effective range region, the energy level of the laser light pulses increases as an angular position along the first axis increases, and wherein, upon transition from one effective range region to an adjacent effective range region as the angular position along the first axis increases, the energy level of the laser light pulses is reduced to a lower value corresponding to a beginning of the adjacent effective range region.

2. The apparatus of claim 1, wherein the non-uniform variation in optical expansion relative to position along the first axis in the scan field comprises a non-linear rate of expansion relative to position along a first axis in the scan field.

3. The apparatus of claim 1, wherein the non-uniform variation in optical expansion relative to position along the first axis in the scan field comprises a greater optical expansion relative to the position of the laser light pulses in a first side region along the first axis along the first axis compared to lesser optical expansion relative to the position of the laser light pulses in a center region along the first axis between the first side region and a second side region.

4. The apparatus of claim 1, wherein the non-uniform variation in optical expansion includes a non-uniform variation of exit pointing angle and a non-uniform variation in beam width.

5. The apparatus of claim 1, wherein the scan field includes a second axis perpendicular to the first axis, and wherein the light source controller is further configured to vary the energy level of the laser light pulses along the second axis in the scan field.

6. The apparatus of claim 5, wherein the light source controller is further configured to further vary the energy level of the laser light pulses relative to the position along the the second axis to provide different effective ranges in different regions along the second axis in the scan field.

7. The apparatus of claim 5, wherein the second axis comprises a vertical axis, and wherein the light source controller is configured to vary the energy level of the laser light pulses relative to the position along the second axis to provide different effective ranges in different vertical regions.

8. The apparatus of claim 1, wherein the light source controller is further configured to further vary the energy level of the laser light pulses relative to the position along the first axis to dynamically shape an effective range such that different angular regions of the scan field along the first axis have different effective ranges.

9. The apparatus of claim 8, wherein the light source controller is further configured to further vary the energy level of the laser light pulses relative to the position along a second axis to dynamically shape the effective range such that different angular regions of the scan field along the second axis have different effective ranges.

10. The apparatus of claim 1, wherein the light source controller is further configured to further vary the energy level of the laser light pulses relative to the position along the first axis for each scan trajectory to dynamically shape an effective range to generate at least a relatively long range region in a center of the scan field, an intermediate range region in the scan field, and a relatively short range region in the scan field.

11. The apparatus of claim 1, wherein the beam scanning optics includes a horizontal scanning mirror and a vertical scanning mirror, and wherein the expansion optics includes a first lens, a second lens and a third lens, wherein the first lens, the second lens, and the third lens are positioned between the horizontal scanning mirror and the vertical scanning mirror.

12. The apparatus of claim 1, wherein the apparatus is mounted on a moving platform.

13. The apparatus of claim 1, further comprising:
time-of-flight (TOF) circuitry responsive to the detector to determine distances to depth measurement points in the scan field from the detected reflections; and a virtual protective housing circuit that, for a plurality of depth measurement points, causes the laser light source to emit a first laser light pulse at a first energy level to detect an object within a short range, and responsive to determining that there is no object within the short range causes the laser light source to emit at least one second laser light pulse having a total second energy level to detect an object within a long range, wherein the first energy level is lower than the total second energy level.

14. The apparatus of claim 1, wherein the light source controller is configured to determine the energy level of the laser light pulses for each region of the scan field by applying a horizontal adjustment factor associated with an angular position along the first axis and a vertical adjustment factor associated with an angular position along a second axis perpendicular to the first axis, wherein the energy level for each region is determined by combining the corresponding horizontal and vertical adjustment factors.

15. An apparatus comprising:
a laser light source configured to produce infrared (IR) laser light pulses;
an optical assembly, the optical assembly including beam shaping optics, expansion optics, and scanning optics to scan the IR laser light pulses into a scan field, wherein the scan field includes a center region and a first side region and a second side region on opposite sides of the center region, and wherein the expansion optics provide a non-uniform variation in optical expansion of the IR laser light pulses relative to horizontal position along a horizontal axis in the scan field, with a greater increase in optical expansion relative to horizontal position of the IR laser light pulses in the first side region and the second side region and a lesser increase in optical expansion relative to horizontal position of the IR laser light pulses in the center region;
a first IR light detector to detect reflections of the IR laser light pulses from within the scan field;
time-of-flight (TOF) circuitry responsive to the first IR light detector to measure distances to objects at depth measurement points in the scan field; and
a light source controller, the light source controller configured to control the laser light source to vary energy level of the IR laser light pulses according to horizontal position of the IR laser light pulses along the horizontal axis in a manner proportional to the greater increase in optical expansion relative to horizontal position of the IR laser light pulses in the first side region and the second side region and the lesser increase in optical expansion relative to horizontal position of the IR laser light pulses in the center region, wherein, upon transition from the center region to the first side region as an angular position on the horizontal axis increases, the energy level of the laser light pulses is reduced to a lower value corresponding to a beginning of the first side region, and the energy level increases with horizontal position within the first side region.

16. The apparatus of claim 15, wherein the scanning optics includes a horizontal scanning mirror and a vertical scanning mirror, and wherein the expansion optics includes a first lens, a second lens and a third lens, wherein the first lens, the second lens, and the third lens are positioned between the horizontal scanning mirror and the vertical scanning mirror.

17. The apparatus of claim 15, wherein the scan field includes a vertical axis perpendicular to the horizontal axis, and wherein the light source controller is further configured to vary the energy level of the laser light pulses along the vertical axis of the scan field to provide different effective ranges in different regions scan field.

18. The apparatus of claim 15, wherein the scan field includes a vertical axis perpendicular to the horizontal axis and wherein the light source controller is further configured to further vary the energy level of the laser light pulses relative to the vertical position along the vertical axis and the horizontal position along the horizontal axis to provide different effective ranges in different regions of the scan field.

19. The apparatus of claim 15, wherein the light source controller is further configured to further vary the energy level of the laser light pulses relative to the position along the horizontal axis to dynamically shape an effective range such that a plurality of different angular regions beyond the first side region and the second side region of the scan field along the horizontal axis have different effective ranges.

20. The apparatus of claim 19, wherein the light source controller is further configured to further vary the energy level of the laser light pulses relative to the position along a vertical axis to dynamically shape the effective range such that different angular regions of the scan field along the vertical axis have different effective ranges.

21. The apparatus of claim 15, wherein the apparatus is mounted on a moving platform.

22. The apparatus of claim 15, further comprising
a virtual protective housing circuit that, for a plurality of depth measurement points, causes the laser light source to emit a first laser light pulse at a first energy level to detect an object within a short range, and responsive to determining that there is no object within the short range causes the laser light source to emit at least one second laser light pulse having a total second energy level to detect an object within a long range, wherein the first energy level is lower than the total second energy level.

23. An apparatus comprising:
a laser light source configured to produce infrared (IR) laser light pulses;
an optical assembly, the optical assembly including beam shaping optics, expansion optics, and scanning optics to scan the IR laser light pulses into a scan field, and wherein the expansion optics provide a non-uniform variation in optical expansion of the IR laser light pulses relative to horizontal position along a horizontal axis in the scan field;

a first IR light detector to detect reflections of the IR laser light pulses from within the scan field;

time-of-flight (TOF) circuitry responsive to the first IR light detector to measure distances to objects at depth measurement points in the scan field; and a light source controller, the light source controller configured to control the laser light source to vary energy level of the IR laser light pulses according to horizontal position of the IR laser light pulses along the horizontal axis in a manner to compensate for the greater increase in optical expansion relative to horizontal position of the IR laser light pulses in the scan field and to further vary the energy level of the laser light pulses relative to the position along the horizontal axis to dynamically shape effective range regions such that at least three different angular regions of the scan field along the horizontal axis have different effective ranges, wherein, within each effective range region, the energy level of the laser light pulses increases as an angular position along the horizontal axis increases, and wherein, upon transition from one effective range region to an adjacent effective range region as the angular position along the horizontal axis increases, the energy level of the laser light pulses is reduced to a lower value corresponding to a beginning of the adjacent effective range region, and to further vary the energy level of the laser light pulses relative to the position along a vertical axis to dynamically shape the effective range such that at least two different angular regions of the scan field along the vertical axis have different effective ranges.

* * * * *